US00RE50600E

(19) United States
(12) Reissued Patent
Kim et al.

(10) Patent Number: US RE50,600 E
(45) Date of Reissued Patent: *Sep. 23, 2025

(54) DISPLAY DEVICE

(71) Applicant: Samsung Display Co., Ltd., Yongin-si (KR)

(72) Inventors: Byung Sun Kim, Yongin-si (KR); Sun Ja Kwon, Yongin-si (KR); Yang Wan Kim, Yongin-si (KR); Hyun Ae Park, Yongin-si (KR); Hyung Jun Park, Yongin-si (KR); Su Jin Lee, Yongin-si (KR); Jae Yong Lee, Yongin-si (KR); Yu Jin Jeon, Yongin-si (KR)

(73) Assignee: Samsung Display Co., Ltd., Yongin-si (KR)

( * ) Notice: This patent is subject to a terminal disclaimer.

(21) Appl. No.: 18/784,904

(22) Filed: Jul. 25, 2024

Related U.S. Patent Documents

Reissue of:
(64) Patent No.: 11,398,189
Issued: Jul. 26, 2022
Appl. No.: 17/141,077
Filed: Jan. 4, 2021

U.S. Applications:
(63) Continuation of application No. 16/680,256, filed on Nov. 11, 2019, now Pat. No. 10,909,931, which is a
(Continued)

(30) Foreign Application Priority Data

Sep. 12, 2016 (KR) ..... 10-2016-0117555

(51) Int. Cl.
*G09G 3/3266* (2016.01)
*G09G 3/3233* (2016.01)
*G09G 3/3275* (2016.01)

(52) U.S. Cl.
CPC ..... *G09G 3/3266* (2013.01); *G09G 3/3233* (2013.01); *G09G 3/3275* (2013.01);
(Continued)

(58) Field of Classification Search
None
See application file for complete search history.

(56) References Cited

U.S. PATENT DOCUMENTS 6,346,733 B1 * 2/2002 Lee ..... G11C 17/126 257/E27.102
7,830,332 B2 * 11/2010 Park ..... G09G 5/006 345/1.1
(Continued)

FOREIGN PATENT DOCUMENTS

CN 101071245 A 11/2007
CN 101295081 A 10/2008
(Continued)

OTHER PUBLICATIONS

Chinese Office Action Report, Application No. 201710816355.1 dated Mar. 9, 2022, 8 pages.

*Primary Examiner* — Robert J Hance
(74) *Attorney, Agent, or Firm* — Innovation Counsel LLP

(57) ABSTRACT

A display device includes first pixels configured to be positioned in a first pixel area and configured to be connected to first scan lines; first scan stage circuits configured to be positioned in a first peripheral area that is positioned outside the first pixel area and configured to supply first scan signals to the first scan lines; second pixels configured to be positioned in a second pixel area and configured to be connected to second scan lines; and second scan stage circuits configured to be positioned in a second peripheral area that is positioned outside the second pixel area and configured to supply second scan signals to the second scan lines. A gap between adjacent second scan stage circuits is larger than a gap between adjacent first scan stage circuits.

22 Claims, 23 Drawing Sheets

Related U.S. Application Data continuation of application No. 15/492,758, filed on Apr. 20, 2017, now Pat. No. 10,475,389.

(52) U.S. Cl.
CPC ..... *G09G 2300/0413* (2013.01); *G09G 2300/0426* (2013.01); *G09G 2300/0814* (2013.01); *G09G 2300/0819* (2013.01); *G09G 2300/0842* (2013.01); *G09G 2300/0861* (2013.01); *G09G 2310/0232* (2013.01); *G09G 2310/0281* (2013.01); *G09G 2310/0286* (2013.01); *G09G 2310/08* (2013.01); *G09G 2320/0233* (2013.01)

(56) References Cited

U.S. PATENT DOCUMENTS 8,334,960 B2 12/2012 Yang et al.
8,350,253 B1 * 1/2013 Zhu ..... H01L 21/823814 257/19
8,638,280 B2 1/2014 Nonaka
9,153,167 B2 10/2015 Choi
9,837,022 B2 12/2017 Lee et al.
10,152,917 B2 12/2018 Chung
10,229,620 B2 3/2019 Jeon et al.
10,475,389 B2 11/2019 Kim et al.
10,854,128 B2 12/2020 Gao et al.
2006/0214873 A1 9/2006 Park et al.
2007/0001987 A1 * 1/2007 Chun ..... G09G 3/3677 345/100
2007/0063223 A1 * 3/2007 Choi ..... H01L 21/76838 438/587
2008/0012797 A1 1/2008 Kil
2008/0266210 A1 * 10/2008 Nonaka ..... G11C 19/28 345/55
2009/0102758 A1 4/2009 Anzai et al. ..... G09G 3/3266 345/76
2011/0102389 A1 * 5/2011 Park ..... G06F 3/0412 345/205
2012/0206437 A1 * 8/2012 Kang ..... G09G 3/3614 345/55
2013/0201090 A1 8/2013 Ohara ..... G09G 3/2092 345/87
2013/0328840 A1 * 12/2013 Fujikawa ..... G09G 5/0032 345/204
2014/0055333 A1 * 2/2014 Lin ..... G09G 3/3611 345/100
2015/0161931 A1 * 6/2015 Lee ..... G09G 3/3266 345/77
2015/0355487 A1 * 12/2015 Emmert ..... G02F 1/13454 349/33
2015/0356913 A1 * 12/2015 Kim ..... G09G 3/3266 345/215
2016/0035283 A1 * 2/2016 Park ..... G09G 3/3258 345/214
2016/0225306 A1 * 8/2016 Shin ..... G02F 1/1333
2016/0321990 A1 * 11/2016 Kim ..... G09G 3/3233
2017/0116923 A1 4/2017 Bae et al. ..... G11C 19/28
2017/0132984 A1 * 5/2017 Dai ..... G09G 3/3677
2018/0031898 A1 * 2/2018 Tanaka ..... G02F 1/133308
2018/0040683 A1 * 2/2018 Matsueda ..... H10K 59/131
2018/0040684 A1 * 2/2018 Matsueda ..... H10K 59/131
2018/0075810 A1 3/2018 Kim et al.

FOREIGN PATENT DOCUMENTS

CN 102467875 A 5/2012
CN 103487962 A 1/2014
CN 104637442 A 5/2015
CN 105303975 A 2/2016
CN 105427787 A 3/2016
CN 109147645 A 1/2019
CN 107818751 B 11/2022
JP 2000022001 A * 1/2000 ..... G11C 17/126
KR 2009056726 A * 6/2009 ..... G03F 1/36
KR 1020090073966 A 7/2009
KR 20100025684 A * 3/2010
KR 10-2016-0021060 A 2/2016
KR 10-1600274 B1 3/2016
KR 10-2016-0099770 A 8/2016
KR 20160099770 A * 8/2016

* cited by examiner

DISPLAY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a Reissue of U.S. Pat. No. 11,398,189 ("the Patent") granted on Jul. 26, 2022 from U.S. Patent application Ser. No. 17/141,077 filed on Jan. 4, 2021, which* is a continuation application of U.S. Patent application Ser. No. 16/680,256 filed on Nov. 11,2019, *now issued to U.S. Pat. No. 10,909,931,* which is a continuation application of U.S. Patent application Ser. No. 15/492,758 filed on Apr. 20, 2017, now issued to U.S. Pat. No. 10,475,389, Which claims priority under 35 USC § 119 to Korean Patent Application No. 10-2016-0117555, filed on Sep. 12, 2016, in the Korean Intellectual Property Office, the disclosures of Which are incorporated herein by reference in their entirety.

BACKGROUND

1. Field

An exemplary embodiment according to the present disclosure relates to a display device.

2. Description of the Related Art

As the information technology is developed, importance of a display device that provides an interface between a user and information is emphasized. Various types of display devices including a liquid crystal display device, an organic light emitting display device, and the like are widely used.

The display device includes multiple pixels and drivers for driving the pixels.

The drivers can be embedded in the display device, and in this case, a dead space can be formed in the display device.

SUMMARY OF THE INVENTION

An exemplary embodiment of the present disclosure is to provide a display device that can efficiently use a dead space.

In addition, an exemplary embodiment of the present disclosure is to provide a display device that has improved uniformity.

A display device according to an exemplary embodiment of the present disclosure includes: first pixels configured to be positioned in a first pixel area and configured to be connected to first scan lines; first scan stage circuits configured to be positioned in a first peripheral area that is positioned outside the first pixel area and configured to supply first scan signals to the first scan lines; second pixels configured to be positioned in a second pixel area and configured to be connected to second scan lines; and second scan stage circuits configured to be positioned in a second peripheral area that is positioned outside the second pixel area and configured to supply second scan signals to the second scan lines, in which a gap between adjacent second scan stage circuits is larger than a gap between adjacent first scan stage circuits.

In some exemplary embodiment, the second pixel area may have a width smaller than a width of the first pixel area.

In some exemplary embodiment, the gap between the adjacent second scan stage circuits may be set differently from each other according to a position.

In some exemplary embodiment, the display device may further include dummy scan stage circuits configured to be positioned between the adjacent second scan stage circuits.

In some exemplary embodiment, the number of the dummy scan stage circuits may be set differently according to a position.

In some exemplary embodiment, the second scan stage circuits may include a first pair of the adjacent second scan stage circuits and a second pair of the adjacent second scan stage circuits, and a gap between the second pair of the adjacent second scan stage circuits may be larger than a gap between the first pair of the adjacent second scan stage circuits.

In some exemplary embodiment, the display device may further include at least one first dummy scan stage circuit that is disposed between the first pair of the adjacent second scan stage circuits; and second dummy scan stage circuits that are disposed between the second pair of the adjacent second scan stage circuits, in which the number of the second dummy scan stage circuits may be larger than the number of the first dummy scan stage circuit.

In some exemplary embodiment, the second pair of the adjacent second scan stage circuits may be farther away from the first peripheral area than the first pair of the adjacent second scan stage circuits.

In some exemplary embodiment, the first pixel area may include a first sub-pixel area and a second sub-pixel area, the first peripheral area may include a first sub-peripheral area that is positioned outside the first sub-pixel area, and a second sub-peripheral area that is positioned outside the second sub-pixel area, a gap between a pair of the adjacent first scan stage circuits that are positioned in the second sub-peripheral area may be larger than a gap between a pair of the adjacent first scan stage circuits that are positioned in the first sub-peripheral area.

In some exemplary embodiment, the first sub-pixel area may be positioned between the second pixel area and the second sub-pixel area, and the first sub-peripheral area may be positioned between the second peripheral area and the second sub-peripheral area.

In some exemplary embodiment, the first scan stage circuits may be electrically connected to the first scan lines through the first scan routing wires, the second scan stage circuits may be electrically connected to the second scan lines through the second scan routing wires, and lengths of the second scan routing wires may be larger than lengths of the first scan routing wires.

In some exemplary embodiment, the display device may further include third pixels configured to be positioned in a third pixel area and configured to be connected to third scan lines; and third scan stage circuits configured to be positioned in a third peripheral area that is positioned outside the third pixel area and configured to supply third scan signals to the third scan lines.

In some exemplary embodiment, the third pixel area may have a width smaller than a width of the first pixel area, and may be positioned to be separated from the second pixel area.

In some exemplary embodiment, a gap between adjacent third scan stage circuits may be larger than a gap between the adjacent first scan stage circuits.

In some exemplary embodiment, a gap between the adjacent third scan stage circuits may be set differently from each other according to a position.

In some exemplary embodiment, the display device may further include dummy scan stage circuits configured to be positioned between the adjacent third scan stage circuits.

In some exemplary embodiment, the number of the dummy scan stage circuits may be set differently according to a position.

In some exemplary embodiment, the first scan stage circuits may be electrically connected to the first scan lines through the first scan routing wires, the second scan stage circuits may be electrically connected to the second scan lines through the second scan routing wires, the third scan stage circuits may be electrically connected to the third scan lines through the third scan routing wires, and lengths of the second scan routing wires and the third scan routing wires may be larger than lengths of the first scan routing wires.

In some exemplary embodiment, the display device may further include first emission stage circuits configured to be positioned in the first peripheral area and configured to supply first emission control signals to the first pixels through first emission control lines; and second emission stage circuits configured to be positioned in the second peripheral area and configured to supply second emission control signals to the second pixels through second emission control lines.

In some exemplary embodiment, a gap between adjacent second emission stage circuits may be larger than a gap between adjacent first emission stage circuits.

In some exemplary embodiment, the gap between the adjacent second emission stage circuits may be set differently according to a position.

In some exemplary embodiment, the display device may further include dummy emission stage circuits configured to be positioned between the adjacent second emission stage circuits.

In some exemplary embodiment, the number of the dummy emission stage circuits may be set differently according to a position.

According to the exemplary embodiment of the present disclosure, it is possible to provide a display device that can efficiently use a dead space.

In addition, according to another exemplary embodiment of the present disclosure, it is possible to provide a display device that has improved uniformity.

DETAILED DESCRIPTION OF THE INVENTION

Figure 1:
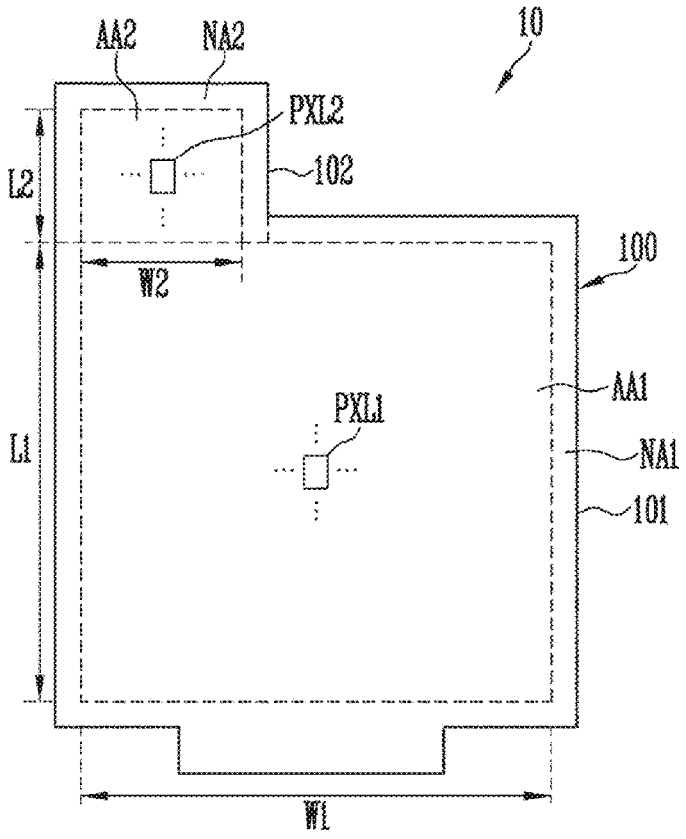
FIG. 1 is a diagram illustrating pixel areas of a display device, according to one embodiment of the present disclosure.

Specific contents of present embodiments are described with reference to the specification and the drawings.

Advantages and characteristics of the present disclosure and a realizing method thereof will become more apparent in view of the attached drawings and the embodiments that will be described in detail. However, the present disclosure is not limited to the embodiments that will be described below, and may be realized in various forms that may be different from each other. In a case where it is hereinafter described that one unit is connected to another unit, the connection includes not only a direct connection but also an electrical connection through a certain element. In addition, portions regardless of the present disclosure are omitted in the drawings for apparent description of the present disclosure, and the same symbols or reference numerals are attached to similar configuration elements through the specification.

Hereinafter, a display device according to embodiments of the present disclosure will be described with reference to the embodiments of the present disclosure and related drawings.

FIG. 1 is a diagram illustrating pixel areas of a display device, according to one embodiment of the present disclosure.

As illustrated in FIG. 1, the display device 10, according to one embodiment of the present disclosure, may include pixel areas AA1 and AA2 and peripheral areas NA1 and NA2.

The pixel areas AA1 and AA2 may include multiple pixels PXL1 and PXL2, thereby, displaying a predetermined image. Hence, the pixel areas AA1 and AA2 may be referred to as a display area.

The peripheral areas NA1 and NA2 may include configuration elements (for example, a driver and wires) for driving the pixels PXL1 and PXL2. The peripheral areas NA1 and NA2 may not include the pixels PXL1 and PXL2, and thus, the peripheral areas NA1 and NA2 may be referred to as a non-display area.

For example, the peripheral areas NA1 and NA2 may be positioned outside the pixel areas AA1 and AA2, and may have a shape that surrounds at least a part of the pixel areas AA1 and AA2.

The pixel areas AA1 and AA2 may include a first pixel area AA1 and a second pixel area AA2.

The second pixel area AA2 may be positioned on one side of the first pixel area AA1, and may have an area smaller than the first pixel area AA1.

For example, a width W2 of the second pixel area AA2 may be set to be smaller than a width W1 of the first pixel area AA1, and a length L2 of the second pixel area AA2 may be set to be smaller than a length L1 of the first pixel area AA1.

The peripheral areas NA1 and NA2 may include a first peripheral area NA1 and a second peripheral area NA2.

The first peripheral area NA1 may be positioned on the periphery of the first pixel area AA1, and may have a shape that surrounds at least a part of the first pixel area AA1.

A width of the first peripheral area NA1 may be set to be substantially uniform along the surrounding periphery of the first pixel area AA1. The width of the first peripheral area NA1 is not limited to this, and may be set differently according to a position.

The second peripheral area NA2 may be positioned on the periphery of the second pixel area AA2, and may have a shape that surrounds at least a part of the second pixel area AA2.

A width of the second peripheral area NA2 may be set to be substantially uniform along the surrounding periphery of the first pixel area AA1. The width of the second peripheral area NA2 is not limited to this, and may be set differently according to a position.

The pixels PXL1 and PXL2 may include first pixels PXL1 and second pixels PXL2.

For example, the first pixels PXL1 may be positioned in the first pixel area AA1, and the second pixels PXL2 may be positioned in the second pixel area AA2.

The pixels PXL1 and PXL2 may emit light with predetermined luminance, according to a control of a driver, and may include one or more light emission elements (for example, an organic light emission diode) for the light emission.

The pixel areas AA1 and AA2 and the peripheral areas NA1 and NA2 may be defined on a substrate 100 of the display unit 10.

The substrate 100 may be formed in various forms in which the pixel areas AA1 and AA2 and the peripheral areas NA1 and NA2 can be set.

For example, the substrate 100 may include a base substrate 101 of a planar shape, and an auxiliary plate 102 that protrudes from one end portion of the base substrate 101 to extend to one side.

According to one embodiment, the auxiliary plate 102 may have an area smaller than an area of the base substrate 101. For example, a width of the auxiliary plate 102 may be set to be smaller than a width of the base substrate 101, and a length of the auxiliary plate 102 may be set to be smaller than a length of the base substrate 101.

The auxiliary plate 102 may have a shape that is the same as or similar to a shape of the second pixel area AA2, but is not limited to this, and may have a shape different from the shape of the second pixel area AA2.

The substrate 100 may be configured by an insulating material such as glass, resin, or the like. In addition, the substrate 100 may be configured by a material with flexibility so as to be bent or folded, and may have a monolayer structure or a multilayer structure.

For example, the substrate 100 may include at least one of polystyrene, polyvinyl alcohol, Polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate.

A material configuring the substrate 100 may be variously changed, and may be configured by Fiber glass reinforced plastic (FRP) or the like.

The first pixel area AA1 and the second pixel area AA2 may have various shapes. For example, each of the first pixel area AA1 and the second pixel area AA2 may have a shape such as a polygonal shape, a ring shape, or the like.

FIG. 1 exemplarily illustrates a case where each of the first pixel area AA1 and the second pixel area AA2 has a quadrangle.

According to one embodiment, at least a part of the first pixel area AA1 may have a curve shape.

For example, a corner portion of the first pixel area AA1 may have a curve shape with a predetermined curvature.

In this case, the first peripheral area NA1 may include at least a part having a curve shape so as to correspond to the curved shape of the first pixel area AA1.

The number of first pixels PXL1 positioned in one line (row or column) may change according to a position, in accordance with a shape change of the first pixel area AA1.

In addition, at least a part of the second pixel area AA2 may have a curve shape. For example, a corner portion of the second pixel area AA2 may have a curve shape with a predetermined curvature.

In this case, the second peripheral area NA2 may include at least a part having a curve shape so as to correspond to the curved shape of the second pixel area AA2.

The number of second pixels PXL2 positioned in one line (row or column) may change according to a position, in accordance with a shape change of the second pixel area AA2.

Figure 2:
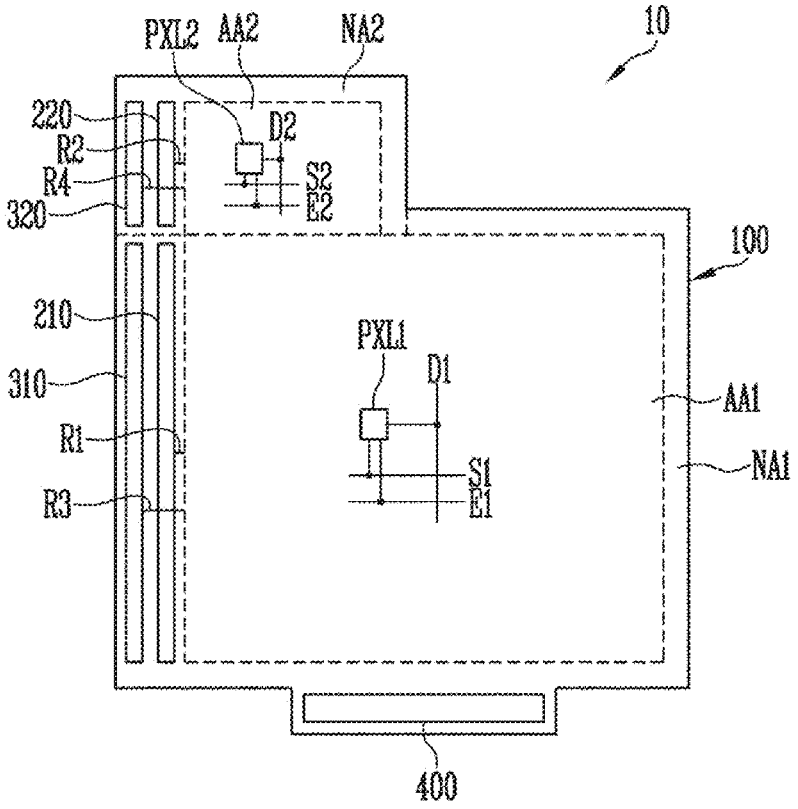
FIG. 2 is a diagram illustrating the display device, according to one embodiment of the present disclosure.

FIG. 2 is a diagram illustrating the display device, according to one embodiment of the present disclosure.

As illustrated in FIG. 2, the display unit 10 may include the substrate 100, the first pixels PXL1, the second pixels PXL2, a first scan driver 210, a second scan driver 220, a first emission driver 310, and a second emission driver 320.

The first pixels PXL1 may be positioned in the first pixel area AA1, and may be respectively connected to first scan lines S1, first emission control lines E1, and first data lines D1.

The first scan driver 210 may supply a first scan signal to the first pixels PXL1 through the first scan lines S1.

For example, the first scan driver 210 may sequentially supply the first scan signals to the first scan lines S1.

The first scan driver 210 may be positioned in the first peripheral area NA1.

For example, the first scan driver 210 may be positioned in the first peripheral area NA1 that is positioned on one side (for example, the left side as shown in FIG. 2) of the first pixel area AA1.

First scan routing wires R1 may be connected between the first scan driver 210 and the first scan lines S1.

According to this, the first scan driver 210 may be electrically connected to the first scan lines S1 positioned in the first pixel area AA1 through the first scan routing wires R1.

The first emission driver 310 may supply a first emission control signal to the first pixels PXL1 through the first emission control lines E1.

For example, the first emission driver 310 may sequentially supply the first emission control signals to the first emission control lines E1.

The first emission driver 310 may be positioned in the first peripheral area NA1.

For example, the first emission driver 310 may be positioned in the first peripheral area NA1 that is positioned on one side (for example, the left side as shown in FIG. 2) of the first pixel area AA1.

FIG. 2 illustrates that the first emission driver 310 is positioned outside the first scan driver 210. However, the first emission driver 310 may be positioned inside the first scan driver 210 in another embodiment.

A third emission routing wire R3 may be connected between the first emission driver 310 and the first emission control lines E1.

According to this, the first emission driver 310 may be electrically connected to the first emission control lines E1 positioned in the first pixel area AA1 through the third emission routing wire R3.

Meanwhile, if the first pixels PXL1 have a structure in which the first emission control signal is not required, the first emission driver 310, the third emission routing wire R3, and the first emission control lines E1 may be omitted.

The second pixels PXL2 may be positioned in the second pixel area AA2, and may be connected to a second scan line S2, a second emission control line E2, and a second data line D2.

The second scan driver 220 may supply a second scan signal to the second pixels PXL1 through the second scan line S2.

For example, the second scan driver 220 may sequentially supply the second scan signals to the second scan line S2.

The second scan driver 220 may be positioned in the second peripheral area NA2.

For example, the second scan driver 220 may be positioned in the second peripheral area NA2 that is positioned on one side (for example, the left side in FIG. 2) of the second pixel area AA2.

A second scan routing wire R2 may be connected between the second scan driver 220 and the second scan line S2.

According to this, the second scan driver 220 may be electrically connected to the second scan line S2 positioned in the second pixel area AA2 through the second scan routing wire R2.

The second emission driver 320 may supply a second emission control signal to the second pixels PXL2 through the second emission control line E2.

For example, the second emission driver 320 may sequentially supply the second emission control signals to the second emission control line E2.

The second emission driver 320 may be positioned in the second peripheral area NA2.

For example, the second emission driver 320 may be positioned in the second peripheral area NA2 that is positioned on one side (for example, the left side as shown in FIG. 2) of the second pixel area AA2.

FIG. 2 illustrates that the second emission driver 320 is positioned outside the second scan driver 220. However, the second emission driver 320 may be positioned inside the second scan driver 220 in another embodiment.

A fourth emission routing wire R4 may be connected between the second emission driver 320 and the second emission control line E2.

According to this, the second emission driver 320 may be electrically connected to the second emission control line E2 positioned in the second pixel area AA2 through the fourth emission routing wire R4.

Meanwhile, if the second pixels PXL2 have a structure in which the second emission control signal is not required, the second emission driver 320, the fourth emission routing wire R4, and the second emission control line E2 may be omitted.

Since the second pixel area AA2 has an area smaller than an area of the first pixel area AA1, lengths of the second scan line S2 and the second emission control line E2 may be smaller than lengths of the first scan lines S1 and the first emission control lines E1.

In addition, the number of second pixels PXL2 connected to the second scan line S2 may be smaller than the number of first pixels PXL1 connected to the first scan lines S1, and the number of second pixels PXL2 connected to the second emission control line E2 may be smaller than the number of the first pixels PXL1 connected to the first emission control lines E1.

The emission control signal may be used for controlling an emission time of the pixels PXL1 and PXL2. According to one embodiment, the emission control signal may be set to have a larger width than a scan signal.

For example, the emission control signal may be set to be a gate-off voltage (for example, a voltage of a high level) such that transistors included in the pixels PXL1 and PXL2 can be turned off, and the scan signal may be set to be a gate-on voltage (for example, a voltage of a low level) such that the transistors included in the pixels PXL1 and PXL2 can be turned on.

A data driver 400 may supply data signals to the pixels PXL1 and PXL2 through the data lines D1 and D2. For example, the second data line D2 may be connected to a part of the first data line D1.

The data driver 400 may be positioned in the first peripheral area NA1, and particularly, may be positioned in a place that does not overlap the first scan driver 210. For example, the data driver 400 may be positioned in the first peripheral area NA1 that is positioned on a lower side of the first pixel area AA1.

The data driver 400 may be provided in various types, such as a chip on glass, a chip on plastic, a tape carrier package, a chip on film, or the like.

For example, the data driver 400 may be directly mounted on the substrate 100, or may be connected to the substrate 100 through another element (for example, a flexible printed circuit board).

Meanwhile, while not illustrated in FIG. 2, the display unit 10 may further include a timing controller that provides a predetermined signal to the first scan drivers 210 and 220, the first emission drivers 310 and 320, and the data driver 400.

Figure 3:
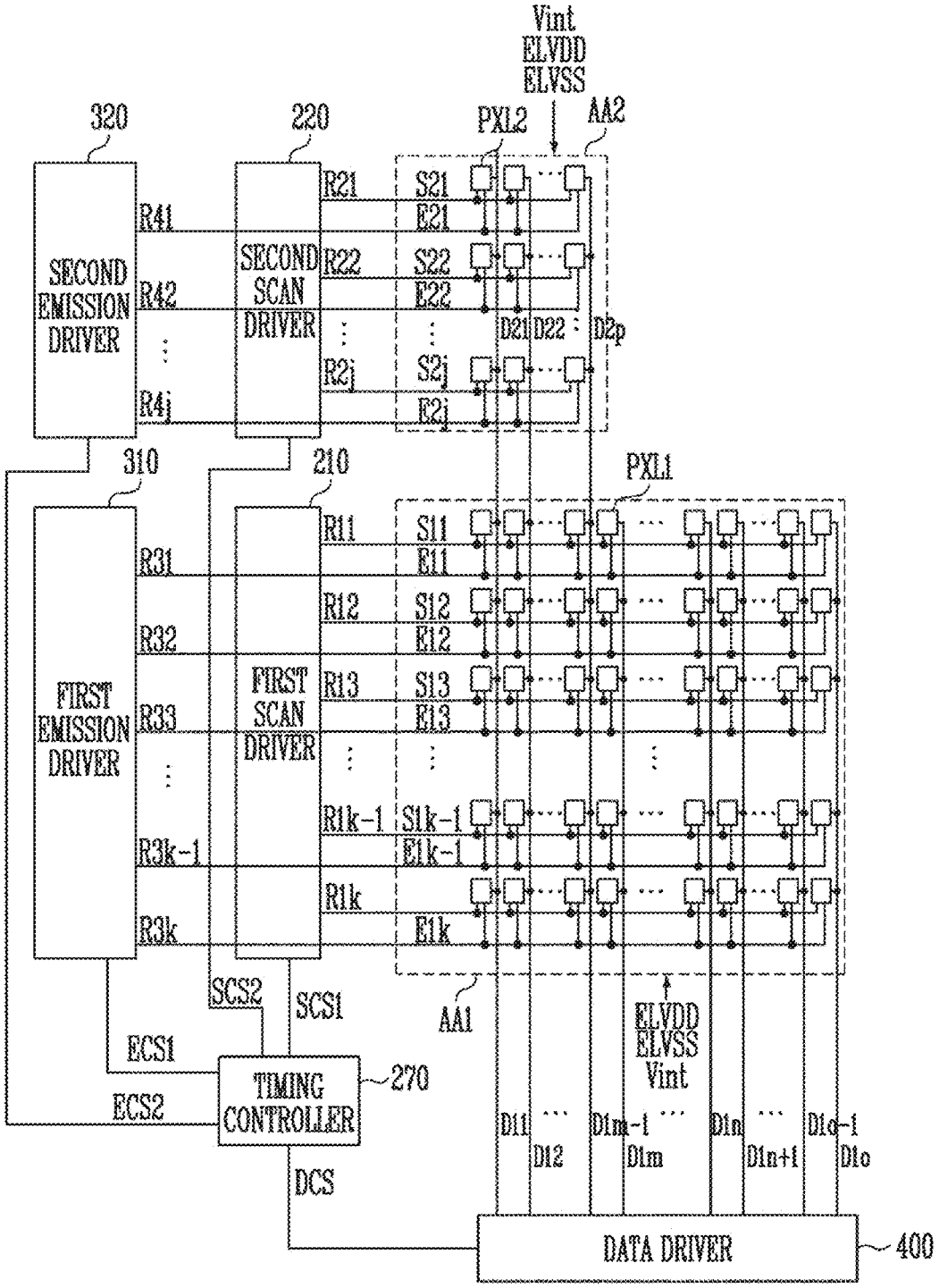
FIG. 3 is a more detailed diagram of the display device, according to one embodiment of the present disclosure.

FIG. 3 is a more detailed diagram of the display device, according to one embodiment of the present disclosure.

The first scan driver 210 may supply a first scan signal to the first pixels PXL1 through first scan routing wires R11 to R1k and first scan lines S11 to S1k.

The first scan routing wires R11 to R1k may be connected between an output terminal of the first scan driver 210 and the first scan lines S11 to S1k.

For example, the first scan routing wires R11 to R1k and the first scan lines S11 to S1k may be positioned in layers different from each other, and in this case, may be connected to each other through a contact hole (not illustrated).

The first emission driver 310 may supply the first emission control signal to the first pixels PXL1 through first emission routing wires R31 to R3k and first emission control lines E11 to E1k.

The first emission routing wires R31 to R3k may be connected between an output terminal of the first emission driver 310 and the first emission control lines E11 to E1k.

For example, the first emission routing wires R31 to R3k and the first emission control lines E11 to E1k may be positioned in layers different from each other, and in this case, may be connected to each other through a contact hole (not illustrated).

The first scan driver 210 and the first emission driver 310 may respectively operate in response to a first scan control signal SCS1 and a first emission control signal ECS1.

The data driver 400 may supply the data signal to the first pixels PXL1 through first data lines D11 to D1o.

The first pixels PXL1 may be connected to a first pixel power supply ELVDD and a second pixel power supply ELVSS. If necessary, the first pixels PXL1 may be further connected to an initialization power supply Vint.

The first pixels PXL1 may receive the data signal from the first data lines D11 to D1o when the first scan signal is supplied to the first scan lines S11 to S1k, and the first pixels PXL1 received the data signal may control a current flowing from the first pixel power supply ELVDD to the second pixel power supply ELVSS through an organic light emission diode (not illustrated).

In addition, the number of the first pixels PXL1 that are positioned in one line (row or column) may change according to a position.

The second scan driver 220 may supply the second scan signal to the second pixels PXL2 through second scan routing wires R21 to R2j and second scan lines S21 to S2j.

The second scan routing wires R21 to R2j may be connected between an output terminal of the second scan driver 220 and the second scan lines S21 to S2j.

For example, the second scan routing wires R21 to R2j and the second scan lines S21 to S2j may be positioned in layers different from each other, and in this case, may be connected to each other through a contact hole (not illustrated).

The second emission driver 320 may supply the second emission control signal to the second pixels PXL2 through second emission routing wires R41 to R4j and second emission control lines E21 to E2j.

The second emission routing wires R41 to R4j may be connected between an output terminal of the second emission driver 320 and the second emission control lines E21 to E2j.

For example, the second emission routing wires R41 to R4j and the second emission control lines E21 to E2j may be positioned in layers different from each other, and in this case, may be connected to each other through a contact hole (not illustrated).

The second scan driver 220 and the second emission driver 320 may respectively operate in response to a second scan control signal SCS2 and a second emission control signal ECS2.

The data driver 400 may supply the data signal to the second pixels PXL2 through the second data lines D21 to D2p.

For example, the second data lines D21 to D2p may be connected to a partial subset of the first data lines, in the present example, first data lines D11 to D1m−1.

In addition, the second pixels PXL2 may be connected to the first pixel power supply ELVDD and the second pixel power supply ELVSS. If necessary, the second pixels PXL2 may be further connected to the initialization power supply Vint.

The second pixels PXL2 may receive the data signal from the second data lines D21 to D2p when the second scan signal is supplied to the second scan lines S21 to S2j, and the second pixels PXL2 received the data signal may control a current flowing from the first pixel power supply ELVDD to the second pixel power supply ELVSS through an organic light emission diode (not illustrated).

In addition, the number of second pixels PXL2 that are positioned in one line (row or column) may change according to a position.

The data driver 400 may operate in response to a data control signal DCS.

Since the second pixel area AA2 has an area smaller than an area of the first pixel area AA1, the number of second pixels PXL2 may be smaller than the number of first pixels PXL1, and lengths and the number of second scan lines S21 to S2j and the second emission control lines E21 to E2j may be respectively set to be smaller than those of the first scan lines S11 to S1k and the first emission control lines E11 to E1k.

The number of second pixels PXL2 connected to any one of the second scan lines S21 to S2j may be smaller than the number of first pixels PXL1 connected to any one of the first scan lines S11 to S1k.

In addition, the number of second pixels PXL2 connected to any one of the second emission control lines E21 to E2j may be smaller than the number of first pixels PXL1 connected to any one of the first emission control lines E11 to E1k.

A timing controller 270 may control the first scan driver 210, the second scan driver 220, the data driver 400, the first emission driver 310, and the second emission driver 320.

The timing controller 270 may supply the first scan control signal SCS1 and the second scan control signal SCS2 to the first scan driver 210 and the second scan driver 220, respectively, and may supply the first emission control signal ECS1 and the second emission control signal ECS2 to the first emission driver 310 and the second emission driver 320, respectively.

Each of the scan control signals SCS1 and SCS2 and the emission control signals ECS1 and ECS2 may include at least one clock signal and a start pulse.

The start pulse may control a timing of the first scan signal or the first emission control signal. The clock signal may be used for shifting the start pulse.

According to one embodiment, the timing controller 270 may supply the data control signal DCS to the data driver 400.

The data control signal DCS may include a source start pulse and at least one clock signal. The source start pulse may be used for controlling a sampling start time point of data, and the clock signal may be used for controlling a sampling operation.

Figure 4:
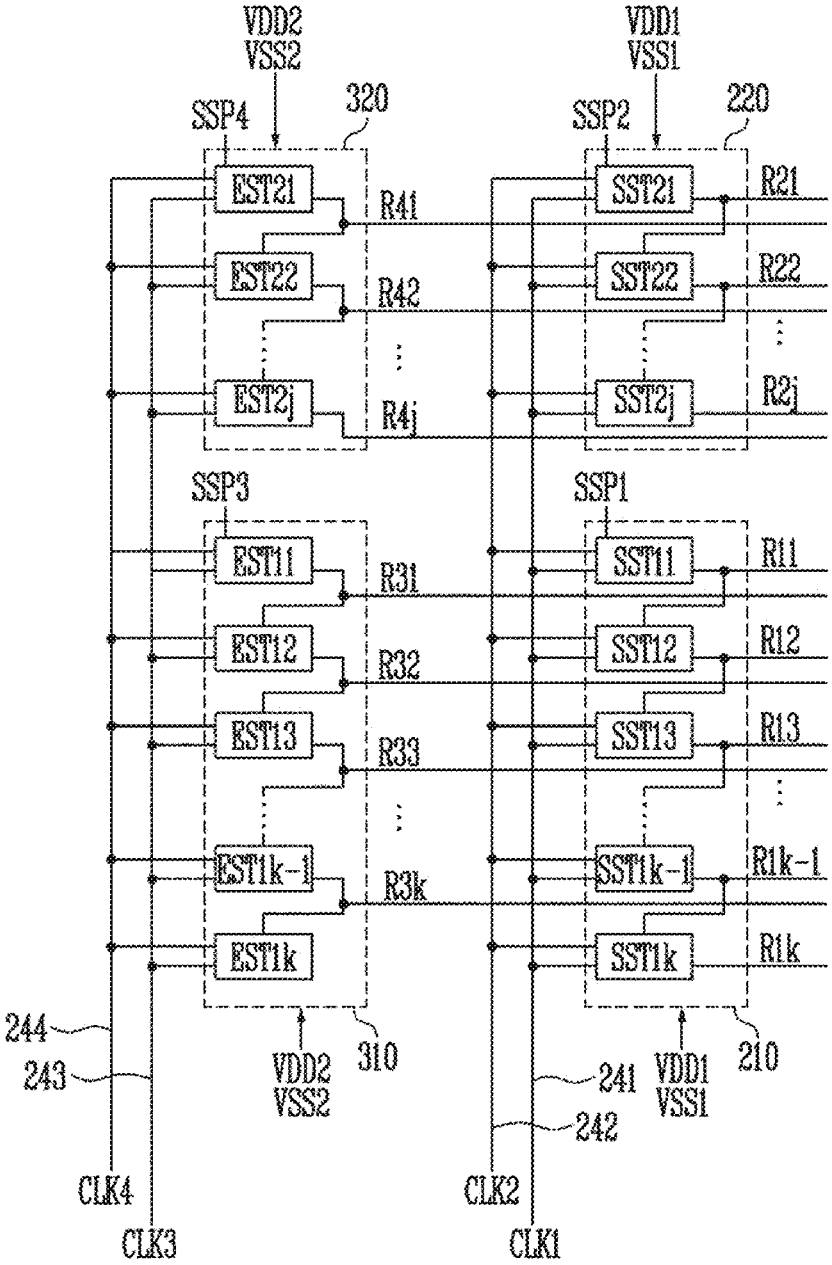
FIG. 4 is a more detailed diagram of scan drivers and emission drivers illustrated in FIG. 3.

FIG. 4 is a more detailed diagram of the scan drivers and the emission drivers illustrated in FIG. 3.

The first scan driver 210 may include multiple the first scan stage circuits SST11 to SST1k.

Each of the first scan stage circuits SST11 to SST1k may be connected to a corresponding terminal of the first scan routing wires R11 to R1k, and may supply the first scan signal to the first scan lines S11 to S1k.

The first scan stage circuits SST11 to SST1k may operate in response to clock signals CLK1 and CLK2 that are supplied from the timing controller 270. According to one embodiment, the first scan stage circuits SST11 to SST1k may be realized by the same circuit.

The first scan stage circuits SST11 to SST1k may receive an output signal (that is, a scan signal) of a prior scan stage circuit, or a start pulse SSP1.

For example, the first circuit SST11 of the first scan stage circuits may receive the start pulse SSP1, and the other circuits SST12 to SST1k of the first scan stage circuits may receive the output signal of the prior scan stage circuit.

In another embodiment, the first circuit SST11 of the first scan stage circuits of the first scan driver 210 may use a signal that is output from the last scan stage circuit SST2j of the second scan driver 220 as the start pulse.

The first scan stage circuits SST11 to SST1k may respectively receive a first drive power supply VDD1 and a second drive power supply VSS1.

Here, the first drive power supply VDD1 may be set as a gate-off voltage such as a high-level voltage. In addition, the second drive power supply VSS1 may be set as a gate-on voltage such as a low-level voltage.

The second scan driver 220 may include multiple second scan stage circuits SST21 to SST2j.

Each of the second scan stage circuits SST21 to SST2j may be connected to a corresponding terminal of the second scan routing wires R21 to R2j, and may supply the second scan signal to the second scan lines S21 to S2j.

The second scan stage circuits SST21 to SST2j may operate in response to the clock signals CLK1 and CLK2 that are supplied from the timing controller 270. According to one embodiment, the second scan stage circuits SST21 to SST2j may be realized by the same circuit.

The second scan stage circuits SST21 to SST2j may receive an output signal (that is, a scan signal) of a prior scan stage circuit, or a start pulse SSP2.

For example, the first circuit SST21 of the second scan stage circuits may receive the start pulse SSP2, and the other circuits SST22 to SST2j of the second scan stage circuits may receive the output signal of the prior scan stage circuit.

According to one embodiment, the last scan stage circuit SST2j of the second scan driver 220 may supply an output signal to the first scan stage circuit SST11 of the first scan driver 210.

The second scan stage circuits SST21 to SST2j may respectively receive the first drive power supply VDD1 and the second drive power supply VSS1.

A first clock line 241 and a second clock line 242 may be connected to the first scan driver 210 and the second scan driver 220.

According to one embodiment, the first clock line 241 and the second clock line 242 may be connected to the timing controller 270, and may transmit the first clock signal CLK1 and the second clock signal CLK2 that are supplied from the timing controller 270 to the first scan driver 210 and the second scan driver 220.

The first clock line 241 and the second clock line 242 may be disposed in the first peripheral area NA1 and the second peripheral area NA2.

The first clock signal CLK1 and the second clock signal CLK2 may have phases different from each other. For example, the second clock signal CLK2 may have a phase difference of 180 degrees with respect to the first clock signal CLK1.

FIG. 4 illustrates a case where the first scan driver 210 and the second scan driver 220 share the same clock lines 241 and 242, the present disclosure is not limited to this, and the first scan driver 210 and the second scan driver 220 may be respectively connected to clock lines separated from each other.

In addition, FIG. 4 illustrates that the scan drivers 210 and 220 respectively use two clock signals CLK1 and CLK2, but the number of clock signals that are used by the scan drivers 210 and 220 may change according to a structure of the scan stage circuit.

The first emission driver 310 may include multiple first emission stage circuits EST11 to EST1k.

Each of the first emission stage circuits EST11 to EST1k may be connected to a corresponding terminal of the first emission routing wires R31 to R3k, and may supply the first emission control signal to the first emission control lines E11 to E1k.

The first emission stage circuits EST11 to EST1k may operate in response to clock signals CLK3 and CLK4 that are supplied from the timing controller 270. According to one embodiment, the first emission stage circuits EST11 to EST1k may be realized by the same circuit.

The first emission stage circuits EST11 to EST1k may receive an output signal (that is, an emission control signal) of a prior emission stage circuit, or a start pulse SSP3.

For example, the first circuit EST11 of the first emission stage circuits may receive the start pulse SSP3, and the other circuits EST12 to EST1k of the first emission stage circuits may receive the output signal of the prior emission stage circuit.

In another embodiment, the first circuit EST11 of the first emission stage circuits of the first emission driver 310 may use a signal that is output from the last emission stage circuit EST2j of the second emission driver 320 as the start pulse.

The first emission stage circuits EST11 to EST1k may respectively receive a third drive power supply VDD2 and a fourth drive power supply VSS2.

Here, the third drive power supply VDD2 may be set as a gate-off voltage such as a high-level voltage. In addition, the fourth drive power supply VSS2 may be set as a gate-on voltage such as a low-level voltage.

According to one embodiment, the third drive power supply VDD2 may have the same voltage as the first drive power supply VDD1, and the fourth drive power supply VSS2 may have the same voltage as the second drive power supply VSS1.

The second emission driver 320 may include multiple second emission stage circuits EST21 to EST2j.

Each of the second emission stage circuits EST21 to EST2j may be connected to a corresponding terminal of the second emission routing wires R41 to R4j, and may supply the second emission control signal to the second emission control lines E21 to E2j.

The second emission stage circuits EST21 to EST2j may operate in response to the clock signals CLK3 and CLK4 that are supplied from the timing controller 270. According to one embodiment, the second emission stage circuits EST21 to EST2j may be realized by the same circuit.

The second emission stage circuits EST21 to EST2j may receive an output signal (that is, an emission control signal) of a prior emission stage circuit, or a start pulse SSP4.

For example, the first circuit EST21 of the second emission stage circuits may receive the start pulse SSP4, and the other circuits EST22 to EST2j of the second emission stage circuits may receive the output signal of the prior emission stage circuit.

According to one embodiment, the last emission stage circuit EST2j of the second emission driver 320 may supply an output signal to the first emission stage circuit EST11 of the first emission driver 310.

The second emission stage circuits EST21 to EST2j may respectively receive the third drive power supply VDD2 and the fourth drive power supply VSS2.

A third clock line 243 and a fourth clock line 244 may be connected to the first emission driver 310 and the second emission driver 320.

According to one embodiment, the third clock line 243 and the fourth clock line 244 may be connected to the timing controller 270, and may transmit the third clock signal CLK3 and the fourth clock signal CLK4 that are supplied from the timing controller 270 to the first emission driver 310 and the second emission driver 320.

The third clock line 243 and the fourth clock line 244 may be disposed in the first peripheral area NA1 and the second peripheral area NA2.

The third clock signal CLK3 and the fourth clock signal CLK4 may have phases different from each other. For example, the third clock signal CLK3 may have a phase difference of 180 degrees with respect to the fourth clock signal CLK4.

FIG. 4 illustrates a case where the first emission driver 310 and the second emission driver 320 share the same clock lines 243 and 244, the present disclosure is not limited to this, and the first emission driver 310 and the second emission driver 320 may be respectively connected to clock lines separated from each other.

In addition, FIG. 4 illustrates that the emission drivers 310 and 320 respectively use two clock signals CLK3 and CLK4, but the number of clock signals that are used by the emission drivers 310 and 320 may change according to a structure of the emission stage circuit.

Figure 5:
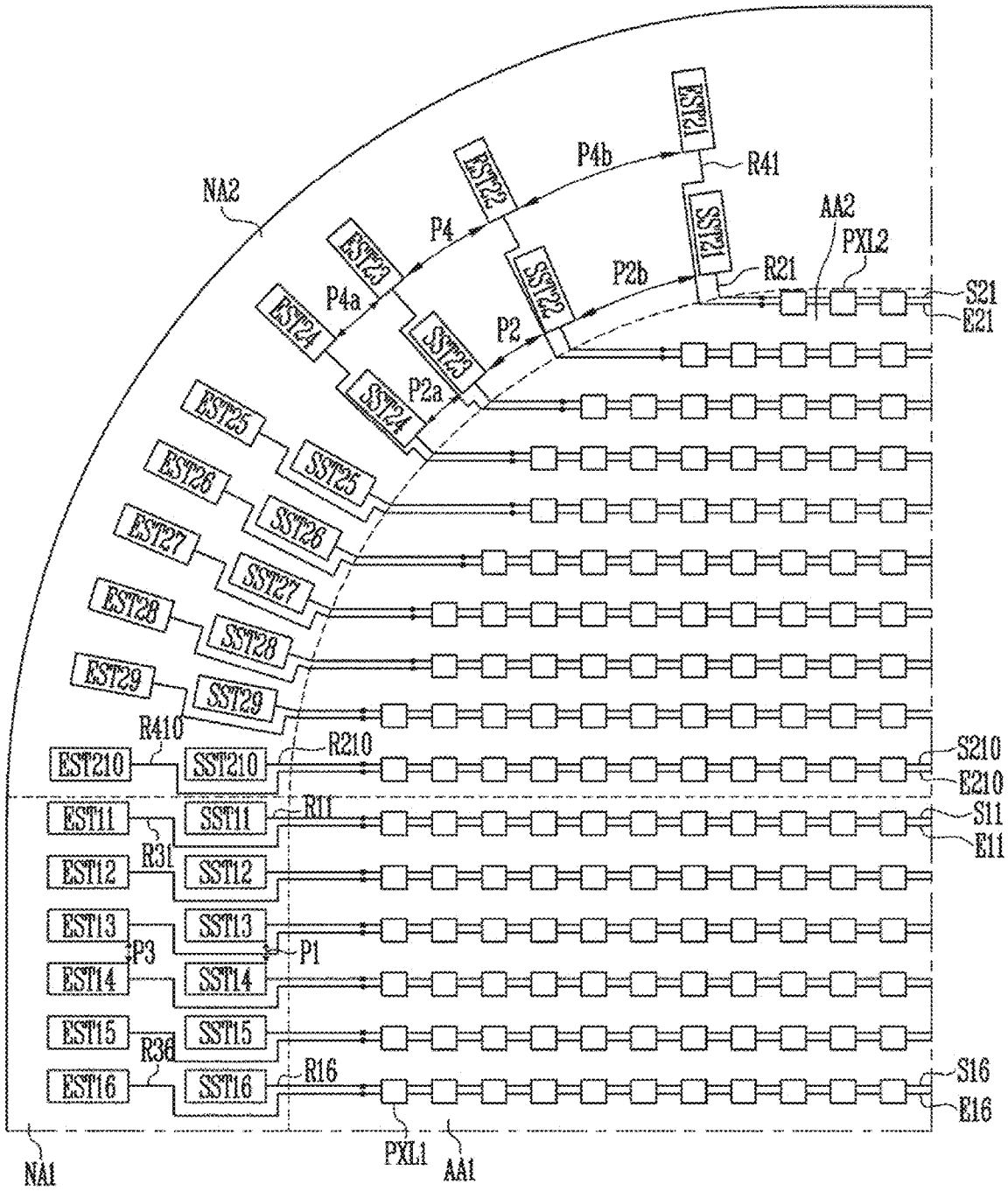
FIG. 5 is a diagram illustrating a layout structure of scan stage circuits and emission stage circuits, according to one embodiment of the present disclosure.

FIG. 5 is a diagram illustrating a layout structure of the scan stage circuits and the emission stage circuits, according to one embodiment of the present disclosure.

Particularly, FIG. 5 exemplarily illustrates partial first scan stage circuits SST11 to SST16 and partial first emission stage circuits EST11 to EST16 that are disposed in the first peripheral area NA1, and partial second scan stage circuits SST21 to SST210 and partial second emission stage circuits EST21 to EST210 that are disposed in the second peripheral area NA2.

As illustrated in FIG. 5, a corner portion of the second peripheral area NA2 may have a curve shape. For example, an area where the second scan stage circuits SST21 to SST210 and the second emission stage circuits EST21 to EST210 are disposed, in the second peripheral area NA2, may have a bent shape with predetermined curvature as illustrated in FIG. 5.

A corner portion of the second pixel area AA2 corresponding to the curved shape of the second peripheral area NA2 may also have a curve shape.

In order for the corner portion of the second pixel area AA2 to have a curve shape, the farther the row of the pixels in the second pixel area AA2 are from the first pixel area AA1, the smaller number of the pixels PXL2 the row may include.

The farther the row of the pixels arranged in the second pixel area AA2 are from the first pixel area AA1, the smaller the length of the row is. The length may not be required to be reduced in the same ratio, and the number of second pixels PXL2 included in each row of the pixels may variously change according to curvature of a curve forming the corner portion of the second pixel area AA2.

The first peripheral area NA1 may have a straight line shape, and in this case, the first pixel area AA1 may have a quadrangle.

All the rows of the pixels in the first pixel area AA1 may include the same number of the first pixels PXL1.

Unlike the first peripheral area NA1, the second peripheral area NA2 has a curve shape, and thus, a layout structure of the second scan stage circuits SST21 to SST210 and the second emission stage circuits EST21 to EST210 in the second peripheral area NA2 may be set differently from a layout structure of the first scan stage circuits SST11 to SST16 and the first emission stage circuits EST11 to EST16 in the first peripheral area NA1 so as to efficiently use the second peripheral area NA2 that may be a dead space.

For example, a gap P2 between the adjacent second scan stage circuits SST21 to SST210 may be set to be larger than a gap P1 between the adjacent first scan stage circuits SST11 to SST16.

The gaps P1 between the adjacent first scan stage circuits SST11 to SST16 may be set to be constant.

In addition, the gaps P2 between the adjacent second scan stage circuits SST21 to SST210 may be set differently from each other according to a position.

For example, a gap P2a between a pair of the second scan stage circuits SST23 and SST24 may be set differently from a gap P2b between a pair of the second scan stage circuits SST21 and SST22.

Specifically, the gap P2b between the pair of the second scan stage circuits SST21 and SST22 may be set to be larger than the gap P2a between the pair of the second scan stage circuits SST23 and SST24.

In the present example, the pair of the second scan stage circuits SST21 and SST22 may be positioned farther from the first peripheral area NA1, compared with the pair of the second scan stage circuits SST23 and SST24.

In other words, the farther the gap P2 between the adjacent second scan stage circuits SST21 to SST210 are from the first peripheral area NA1, the larger the gap P2 may become.

In addition, the second scan stage circuits SST21 to SST210 may have a predetermined slope, compared with the first scan stage circuits SST11 to SST16. For example, the farther the second scan stage circuits SST21 to SST210 are from the first peripheral area NA1, the larger the slope may become.

Meanwhile, the second emission stages EST21 to EST210 may be disposed in the substantially similar manner as the second scan stage circuits SST21 to SST210.

For example, a gap P4 between the adjacent second emission stages EST21 to EST210 may be set to be larger than a gap P3 between the adjacent first emission stage circuits EST11 to EST16.

For example, the gaps P3 between the adjacent first emission stage circuits EST11 to EST16 may be constant.

In addition, the gaps P4 between the adjacent second emission stages EST21 to EST210 may be set differently from each other according to a position.

For example, a gap P4a between a pair of the second emission stages EST23 and EST24 may be set differently from a gap P4b between a pair of the second emission stages EST21 and EST22.

Specifically, the gap P4b between the pair of the second emission stages EST21 and EST22 may be set to be larger than the gap P4a between the pair of the second emission stages EST23 and EST24.

In the present example, the pair of the second emission stages EST21 and EST22 may be positioned farther away from the first peripheral area NA1, compared with the pair of the second emission stages EST23 and EST24.

In other words, the farther the gap P4 between the adjacent second emission stages EST21 to EST210 is from the first peripheral area NA1, the larger the gap P4 may become.

The second emission stage circuits EST21 to EST210 may have a predetermined slope, compared with the first emission stage circuits EST11 to EST16. For example, the farther the second emission stage circuits EST21 to EST210 are from the first peripheral area NA1, the larger the slope may become.

The first scan stage circuits SST11 to SST16 may be electrically connected to the first scan lines S11 to S16 through the first scan routing wires R11 to R16, and the second scan stage circuits SST21 to SST210 may be electrically connected to the second scan lines S21 to S210 through the second scan routing wires R21 to R210.

In this case, since the corner portion of the second pixel area AA2 is set to have a curve shape, lengths of the second scan routing wires R21 to R210 may be set to be larger than lengths of the first scan routing wires R11 to R16.

According to one embodiment, a connection point between the first scan routing wires R11 to R16 and the first scan lines S11 to S16 may be positioned within the first pixel area AA1, and a connection point between the second scan routing wires R21 to R210 and the second scan lines S21 to S210 may be positioned within the second pixel area AA2.

In addition, the first emission stage circuits EST11 to EST16 may be electrically connected to the first emission control lines E11 to E16 through the first emission routing wires R31 to R36, and the second emission stages EST21 to EST210 may be electrically connected to the second emission control lines E21 to E210 through the second emission routing wires R41 to R410.

In this case, since the corner portion of the second pixel area AA2 is set to have a curve shape, lengths of the second emission routing wires R41 to R410 may be set to be larger than lengths of the first emission routing wires R31 to R36.

According to one embodiment, a connection point between the first emission routing wires R31 to R36 and the first emission control lines E11 to E16 may be positioned within the first pixel area AA1, and a connection point between the second emission routing wires R41 to R410 and the second emission control lines E21 to E210 may be positioned within the second pixel area AA2.

Figure 6A:
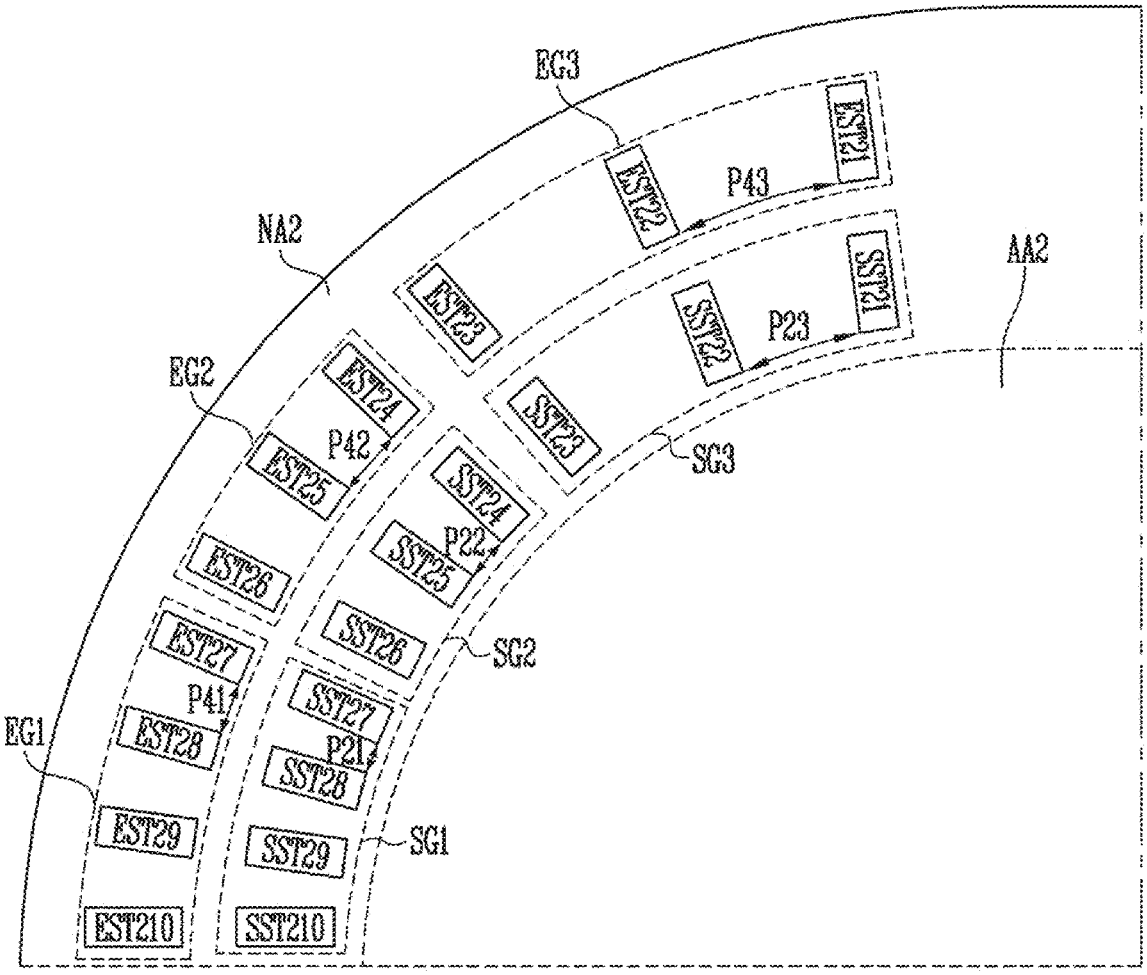
FIG. 6A and FIG. 6B are diagrams illustrating layout structures of second scan stage circuits and second emission stage circuits, according to various embodiments of the present disclosure.
Figure 6B:
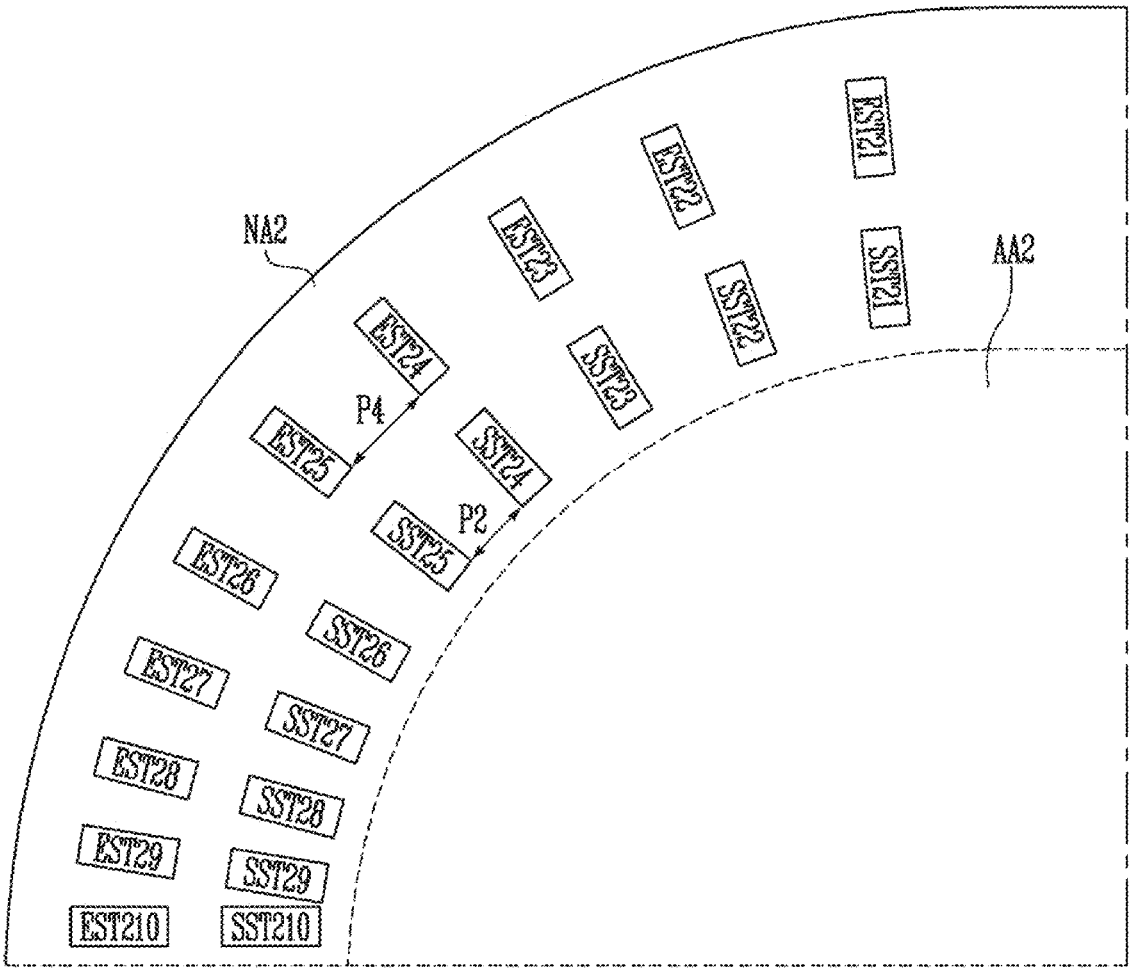

FIG. 6A and FIG. 6B are diagrams illustrating layout structures of the second scan stage circuits and the second emission stage circuits, according to various embodiments of the present disclosure.

Particularly, FIGS. 6A and 6B illustrate the second scan stage circuits SST21 to SST210 and the second emission stages EST21 to EST210 that are disposed in the second peripheral area NA2 for the sake of convenience.

As illustrated in FIG. 6A, gaps P21, P22, and P23 between the adjacent second scan stage circuits SST21 to SST210 may be set differently from each other by groups SG1, SG2, and SG3.

For example, the second scan stage circuits SST27 to SST210 included in the first group SG1 may be disposed with a first gap P21 therebetween, the second scan stage circuits SST24 to SST26 included in the second group SG2 may be disposed with a second gap P22 therebetween, and the second scan stage circuits SST21 to SST23 included in the third group SG3 may be disposed with a third gap P23 therebetween.

In this case, the first gap P21, the second gap P22, and the third gap P23 may be set differently from one another.

For example, the first gap P21, the second gap P22, and the third gap P23 may have larger values in an ascending order.

In addition, gaps P41, P42, and P43 between the adjacent second emission stages EST21 to EST210 may be set differently from each other by groups EG1, EG2, and EG3.

For example, the second emission stage circuits EST27 to EST210 included in the first group EG1 may be disposed with a first gap P41 therebetween, the second emission stage circuits EST24 to EST26 included in the second group EG2 may be disposed with a second gap P42 therebetween, and the second emission stage circuits EST21 to EST23 included in the third group EG3 may be disposed with a third gap P43 therebetween.

In this case, the first gap P41, the second gap P42, and the third gap P43 may be set differently from one another.

For example, the first gap P41, the second gap P42, and the third gap P43 may have larger values in an ascending order.

As illustrated in FIG. 6B, the gap P2 between the adjacent second scan stage circuits SST21 to SST210 may gradually increase.

For example, the closer the gap P2 between the adjacent second scan stage circuits SST21 to SST210 is to one side (for example, an upper side as shown in FIG. 6B), the larger the gap P2 may become.

According to this, the gaps P2 adjacent to each other may be set differently from each other.

In addition, the gap P4 between the adjacent second emission stages EST21 to EST210 may gradually increase.

For example, the closer the gap P4 between the adjacent second emission stage circuits EST21 to EST210 is to one side (for example, an upper side as shown in FIG. 6B), the larger the gap P4 may become.

According to this, the gaps P4 adjacent to each other may be set differently from each other.

Figure 7:
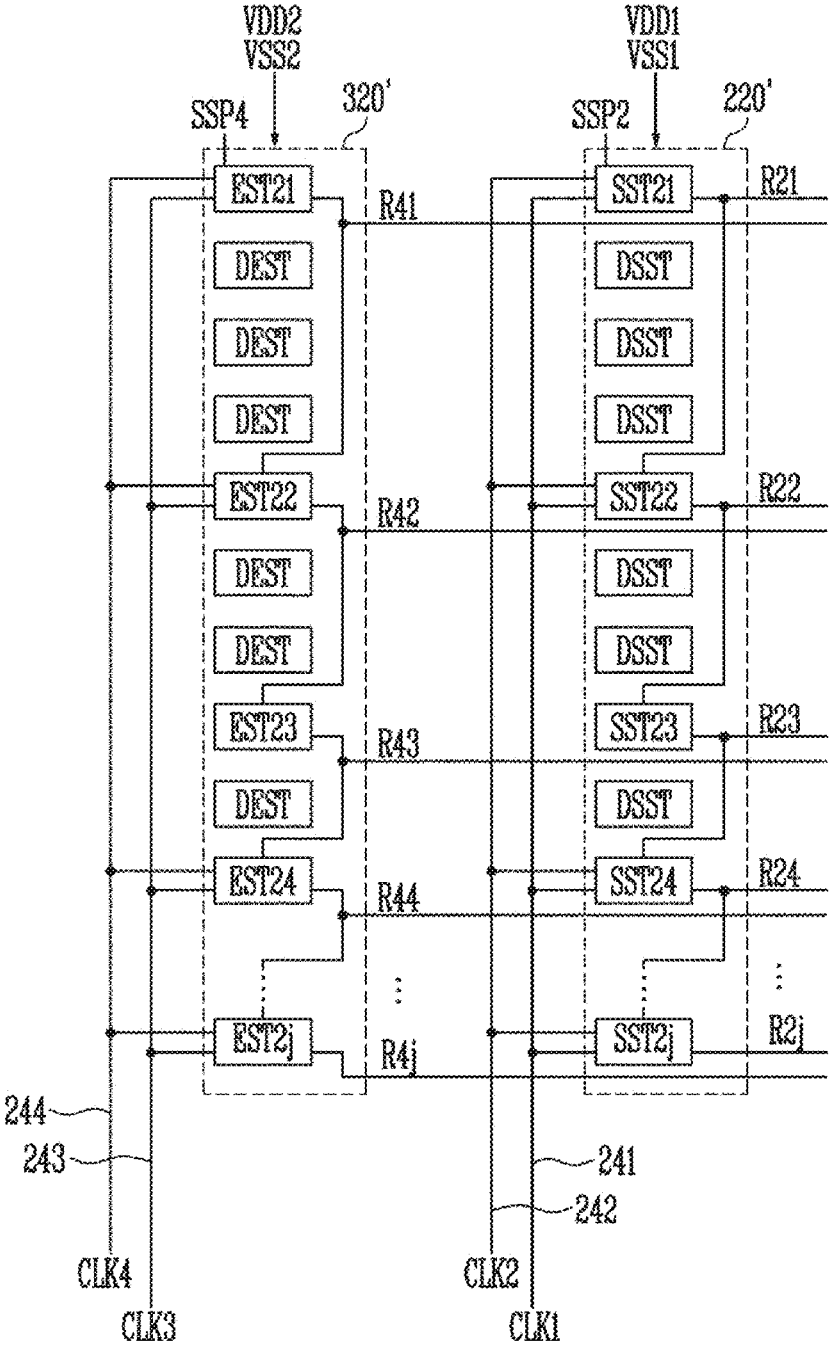
FIG. 7 is a diagram illustrating a second scan driver and a second emission driver, according to another embodiment of the present disclosure.

FIG. 7 is a diagram illustrating a second scan driver and a second emission driver, according to another embodiment of the present disclosure.

As illustrated in FIG. 7, the second scan driver 220' may further include one or more dummy scan stage circuits DSST.

Since the dummy scan stage circuits DSST are positioned between the second scan stage circuits SST21 to SST2j, critical dimension (CD) uniformity of the second scan driver 220' may increase.

For example, the dummy scan stage circuits DSST may be positioned between the second scan stage circuits SST21 to SST2j, and the number of dummy scan stage circuits DSST may be set differently according to a position.

The dummy scan stage circuits DSST may have the same circuit structure as the second scan stage circuits SST21 to SST2j, but are not connected to the clock lines 241 and 242, and thereby, an output operation of the scan signal is not performed.

Meanwhile, the second emission driver 320' may further include one or more dummy emission stage circuits DEST.

The dummy emission stage circuits DEST are positioned between the second emission stage circuits EST21 to EST2j, CD uniformity of the second emission driver 320' may increase.

For example, the dummy emission stage circuits DEST may be positioned between the second emission stage circuits EST21 to EST2j, and the number of dummy emission stage circuits DEST may be set differently according to a position.

The dummy emission stage circuits DEST may have the same circuit structure as the second emission stage circuits EST21 to EST2j, but are not connected to the clock lines 243 and 244, and thereby, an output operation of the emission signal is not performed.

Figure 8:
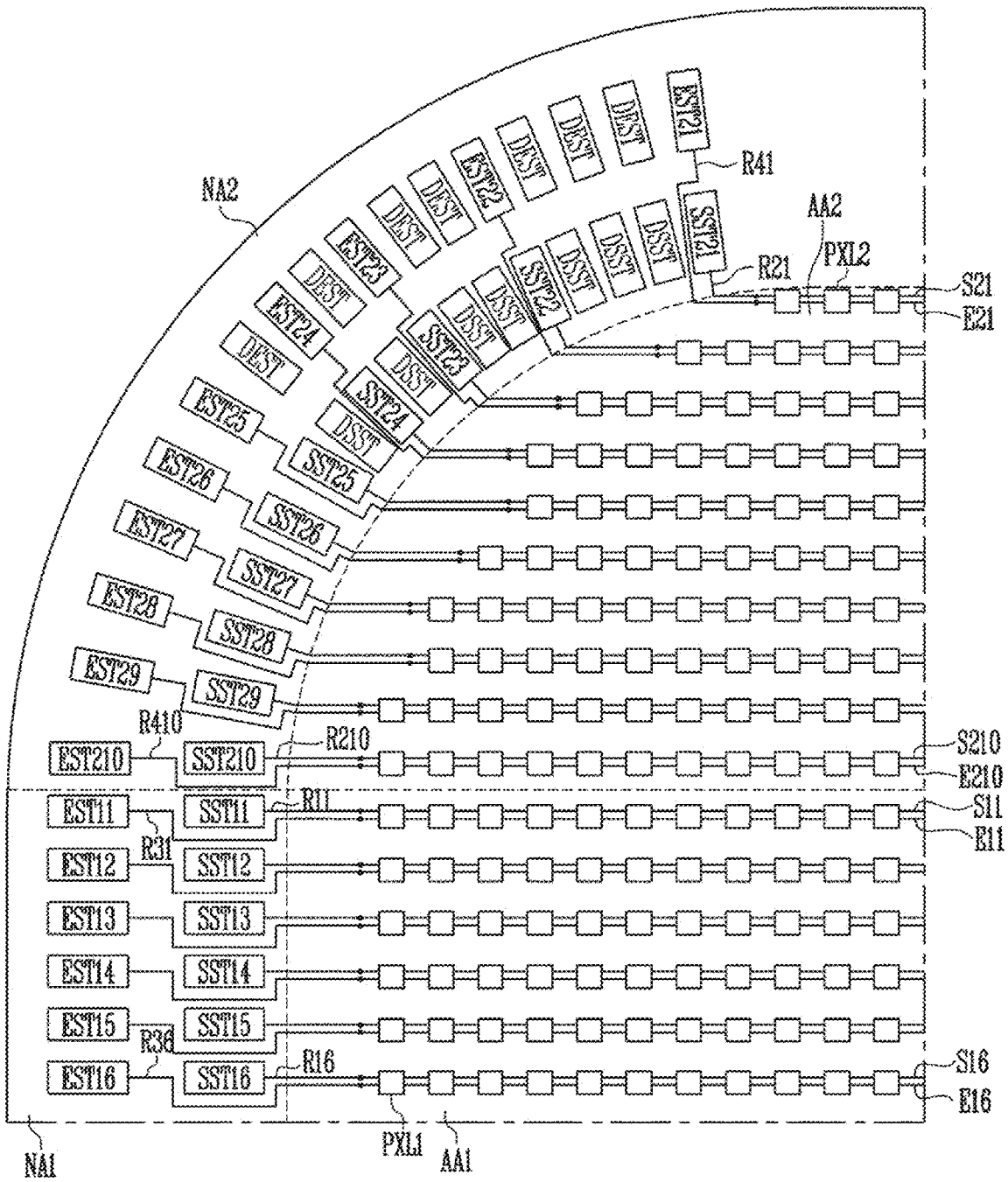
FIG. 8 is a diagram illustrating a layout structure of dummy stage circuits, according to one embodiment of the present disclosure.

FIG. 8 is a diagram illustrating a layout structure of the dummy stage circuits, according to one embodiment of the present disclosure.

Particularly, FIG. 8 illustrates a shape in which the dummy stage circuits DSST and DEST are disposed in the circuits as illustrated in FIG. 5.

As illustrated in FIG. 8, the dummy scan stage circuits DSST may be disposed in the second peripheral area NA2, and may be positioned between the second scan stage circuits SST21 to SST210.

FIG. 8 illustrates a case where the dummy scan stage circuits DSST are partially positioned between the second scan stage circuits SST21 to SST25.

The number of dummy scan stage circuits DSST may change according to a position.

For example, the number of dummy scan stage circuits DSST positioned between a pair of the second scan stage circuits SST23 and SST24 may be different from the number of dummy scan stage circuits DSST positioned between a pair of the second scan stage circuits SST21 and SST22.

Specifically, the number of dummy scan stage circuits DSST positioned between the pair of the second scan stage circuits SST21 and SST22 may be set to be larger than the number of dummy scan stage circuits DSST positioned between the pair of the second scan stage circuits SST23 and SST24.

In the present example, the pair of the second scan stage circuits SST21 and SST22 may be positioned farther away from the first peripheral area NA1, compared with the pair of the second scan stage circuits SST23 and SST24.

Meanwhile, the dummy emission stage circuits DEST may be disposed in the second peripheral area NA2, and may be positioned between the adjacent second emission stages EST21 to EST210.

FIG. 8 illustrates a case where the dummy emission stage circuits DEST are partially positioned between the second emission stages EST21 to EST25.

The number of dummy emission stage circuits DEST may change according to a position.

For example, the number of dummy emission stage circuits DEST positioned between a pair of the second emission stage circuits EST23 and EST24 may be different from the number of dummy emission stage circuits DEST positioned between a pair of the second emission stage circuits EST21 and EST22.

Specifically, the number of dummy emission stage circuits DEST positioned between the pair of the second emission stage circuits EST21 and EST22 may be set to be larger than the number of dummy emission stage circuits DEST positioned between the pair of the second emission stage circuits EST23 and EST24.

In the present example, the pair of the second emission stage circuits EST21 and EST22 may be positioned farther away from the first peripheral area NA1, compared with the pair of the second emission stage circuits EST23 and EST24.

Meanwhile, while not illustrated separately, the dummy scan stage circuits DSST and the dummy emission stage circuits DEST may be additionally disposed in the embodiments illustrated in FIGS. 6A and 6B various forms.

Figure 9A:
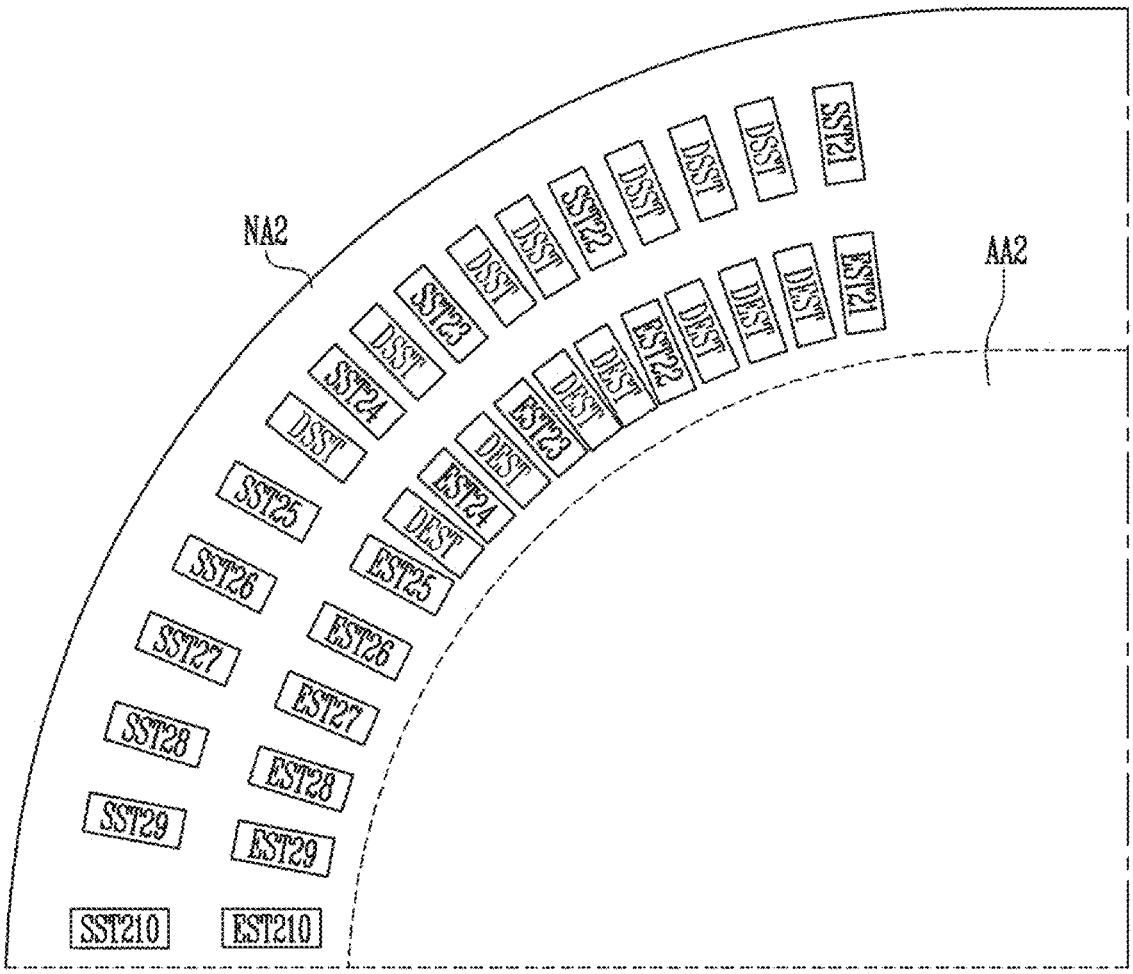
FIG. 9A and FIG. 9B are diagrams illustrating layout structures of the dummy stage circuits, according to various embodiments of the present disclosure.
Figure 9B:
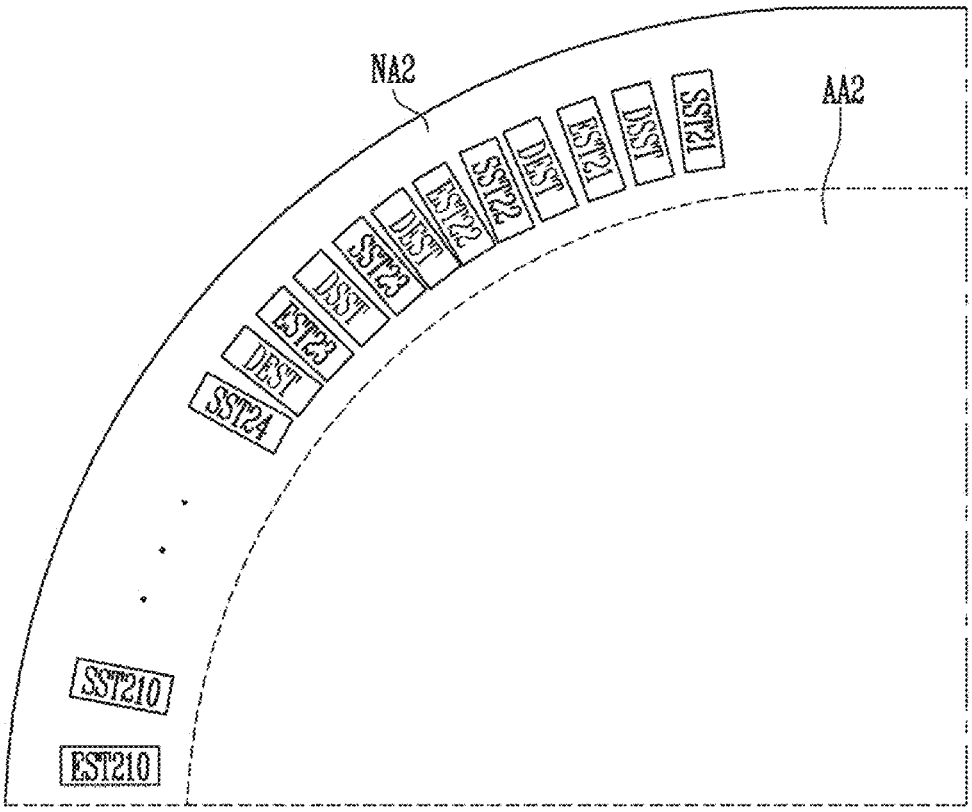

FIG. 9A and FIG. 9B are diagrams illustrating layout structures of the dummy stage circuits, according to various embodiments of the present disclosure.

Particularly, FIGS. 9A and 9B illustrate the second scan stage circuits SST21 to SST210, the dummy scan stage circuits DSST, the second emission stages EST21 to EST210, and the dummy emission stage circuits DEST that are disposed in the second peripheral area NA2 for the sake of convenience.

As illustrated in FIG. 9A, the second scan stage circuits SST21 to SST210 and the dummy scan stage circuits DSST may be positioned outside the second emission stages EST21 to EST210 and the dummy emission stage circuits DEST.

For example, a position of the second scan stage circuits SST21 to SST210 may be replaced with a position of the second emission stages EST21 to EST210, and a position of the dummy scan stage circuits DSST may be replaced with the dummy emission stage circuits DEST, compared with FIG. 8.

According to this layout structure, the second emission stages EST21 to EST210 and the dummy emission stage circuits DEST may be positioned closer to the second pixel area AA2, compared with the second scan stage circuits SST21 to SST210 and the dummy scan stage circuits DSST.

As illustrated in FIG. 9B, the second scan stage circuits SST21 to SST210 and the second emission stages EST21 to EST210 may be positioned along the same line.

For example, the second scan stage circuits SST21 to SST210 and the second emission stages EST21 to EST210 are disposed on different lines in FIG. 9A, but the second scan stage circuits SST21 to SST210 and the second emission stages EST21 to EST210 may be disposed on the same line.

In this case, the second scan stage circuits SST21 to SST210 may be interposed between the second emission stages EST21 to EST210.

In addition, the dummy scan stage circuits DSST and the dummy emission stage circuits DEST may be disposed in various types between the second scan stage circuits SST21 to SST210 and the second emission stages EST21 to EST210.

Figure 10:
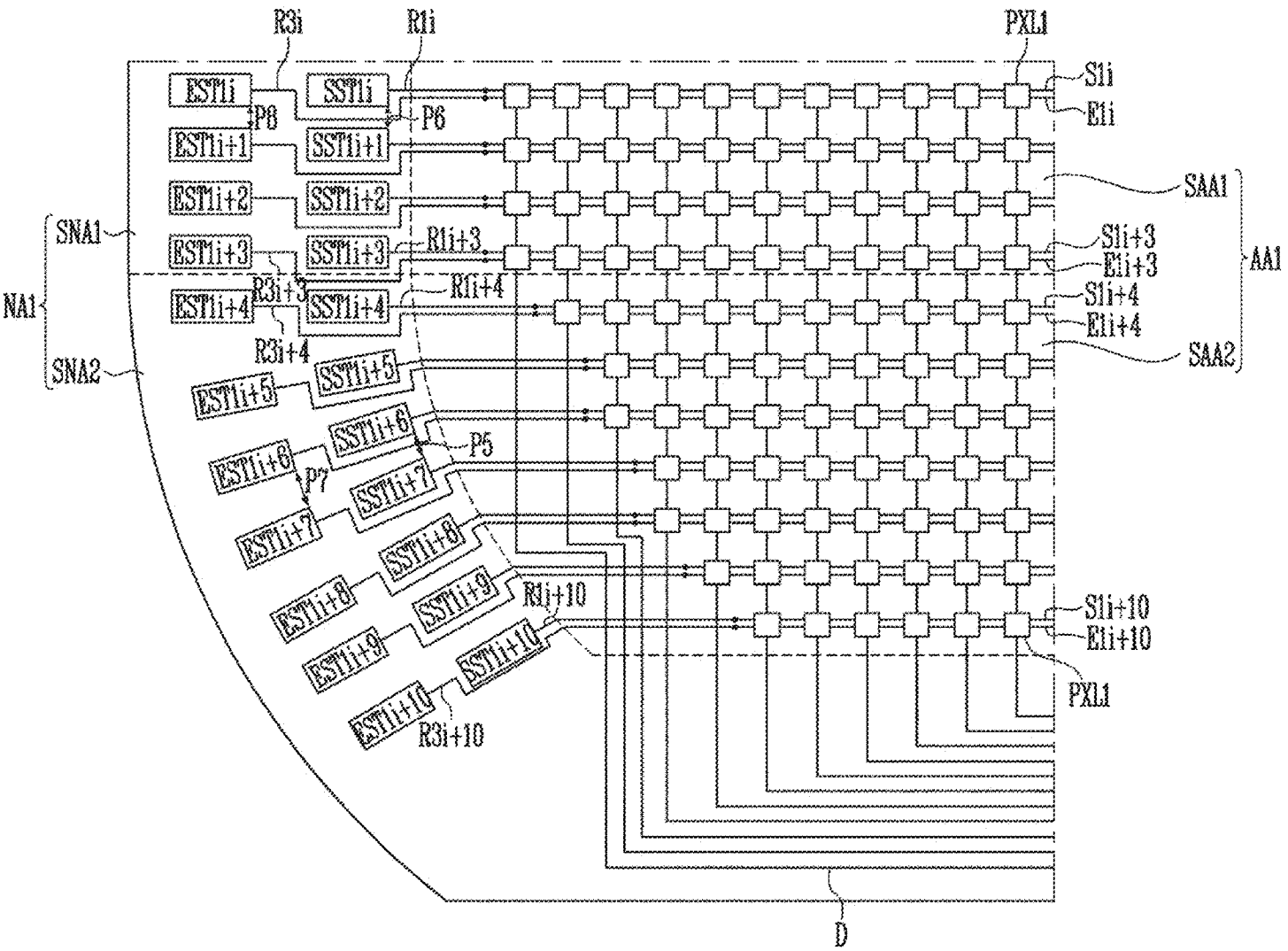
FIG. 10 is a diagram illustrating a layout structure of first scan stage circuits and first emission stage circuits, according to one embodiment of the present disclosure.

FIG. 10 is a diagram illustrating a layout structure of the first scan stage circuits and the first emission stage circuits, according to one embodiment of the present disclosure.

As illustrated in FIG. 10, the first pixel area AA1 may include a first sub-pixel area SAA1 and a second sub-pixel area SAA2.

In addition, the first peripheral area NA1 may include a first sub-peripheral area SNA1 and a second sub-peripheral area SNA2.

The first sub-peripheral area SNA1 may be positioned outside the first sub-pixel area SAA1, and the second sub-peripheral area SNA2 may be positioned outside the second sub-pixel area SAA2.

For example, the first sub-pixel area SAA1 may be positioned between the second pixel area AA2 (not shown) and the second sub-pixel area SAA2, and the first sub-peripheral area SNA1 may be positioned between the second peripheral area NA2 (not shown) and the second sub-peripheral area SNA2.

A corner portion of the second sub-peripheral area SNA2 may have a curve shape. For example, the second sub-peripheral area SNA2 may include partial first scan stage circuits SSTli+4 to SSTli+10 and partial first emission stage circuits ESTli+4 to ESTli+10.

A corner portion of the second sub-pixel area SAA2 corresponding to the corner portion of the second sub-peripheral area SNA2 may also have a curve shape.

In order for the corner portion of the second sub-pixel area SAA2 to have a curve shape, the farther the row of the pixels in the second sub-pixel area SAA2 are from the first sub-pixel area SAA1, the smaller the number of pixels PXL1 may be disposed.

The farther the row of the pixels arranged in the second sub-pixel area SAA2 are from the first sub-pixel area SAA1, the smaller the length of the row is. The length of the row may not be required to be reduced in the same ratio, and the number of pixels PXL1 included in each row of the pixels may variously change according to curvature of a curve forming the corner portion of the second sub-pixel area SAA2.

The first sub-peripheral area SNA1 may have a straight line shape, and in this case, the first sub-pixel area SAA1 has a quadrangle.

According to this layout structure, all the rows of the pixels in the first sub-pixel area SAA1 may include the same number of the pixels PXL1.

For example, the first sub-peripheral area SNA1 may include partial first scan stage circuits SSTli to SSTli+3 and partial first emission stage circuits ESTli to ESTli+3.

Unlike the first sub-peripheral area SNA1, the second sub-peripheral area SNA2 has a curve shape, and thus, a layout structure of the stage circuits may be set differently from the first sub-peripheral area SNA1.

For example, a gap P5 between the adjacent first scan stage circuits SSTli+4 to SSTli+10 may be set to be larger than a gap P6 between the adjacent first scan stage circuits SSTli to SSTli+3.

For example, the gaps P6 between the adjacent first scan stage circuits SSTli to SSTli+3 positioned in the first sub-peripheral area SNA1 may be set to be constant.

In addition, the gaps P5 between the adjacent first scan stage circuits SSTli+4 to SSTli+10 positioned in the second sub-peripheral area SNA2 may be set differently from each other according to a position.

Only the gaps P5 between the first adjacent scan stage circuits SSTli+4 to SSTli+10 positioned in the second sub-peripheral area SNA2 may be limited according to an existence of data lines D. In this case, the gaps P5 between the adjacent first scan stage circuits SSTli+4 to SSTli+10 positioned in the second sub-peripheral area SNA2 may be set to be smaller than the gap P2 between the adjacent second scan stage circuits SST21 to SST210 that are illustrated in FIGS. 5 and 6B.

However, the present disclosure is not limited to this, and the gaps P5 between the adjacent first scan stage circuits SSTli+4 to SSTli+10 positioned in the second sub-peripheral area SNA2 may be set to be equal to or larger than the gap P2 between the adjacent second scan stage circuits SST21 to SST210 that are illustrated in FIGS. 5 and 6B.

In addition, one or more dummy scan stage circuits DSST may also be disposed between the adjacent first scan stage circuits SSTli+4 to SSTli+10 positioned in the second sub-peripheral area SNA2, according to one embodiment.

Meanwhile, a gap P7 between the adjacent first emission stage circuits ESTli+4 to ESTli+10 positioned in the second sub-peripheral area SNA2 may be set to be larger than a gap P8 between the adjacent first emission stage circuits ESTli to ESTli+3 positioned in the first sub-peripheral area SNA1.

For example, the gaps P8 between the adjacent first emission stage circuits ESTli to ESTli+3 positioned in the first sub-peripheral area SNA1 may be set to be constant.

In addition, the gap P7 between the adjacent first emission stage circuits ESTli+4 to ESTli+10 positioned in the second sub-peripheral area SNA2 may be set differently from each other according to a position.

Only the gap P7 between the adjacent first emission stage circuits ESTli+4 to ESTli+10 positioned in the second sub-peripheral area SNA2 may be limited according to an existence of the data lines D. In this case, the gap P7 between the adjacent first emission stage circuits ESTli+4 to ESTli+10 positioned in the second sub-peripheral area SNA2 may be set to be smaller than the gap P4 between the adjacent second emission stages EST21 to EST210 that are illustrated in FIGS. 5 and 6B.

However, the present disclosure is not limited to this, and the gap P7 between the adjacent first emission stage circuits ESTli+4 to ESTli+10 positioned in the second sub-peripheral area SNA2 may be set to be equal to or larger than the gap P4 between the adjacent second emission stages EST21 to EST210 that are illustrated in FIGS. 5 and 6B.

In addition, one or more dummy emission stage circuits DEST may also be disposed between the adjacent first emission stage circuits ESTli+4 to ESTli+10 positioned in the second sub-peripheral area SNA2, according to one embodiment.

Figure 11:
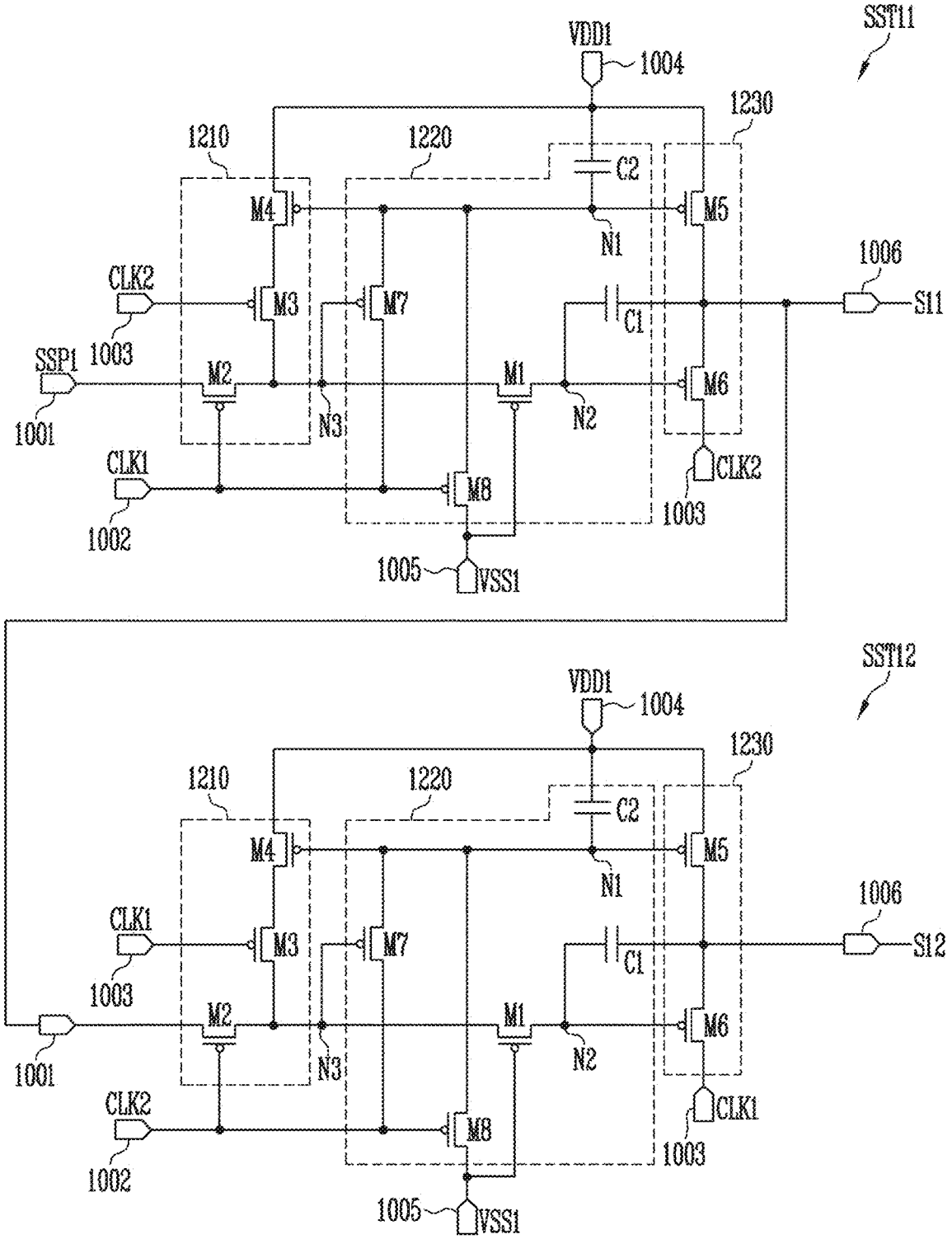
FIG. 11 is a diagram illustrating the scan stage circuit, according to one embodiment of the present disclosure.

FIG. 11 is a diagram illustrating the scan stage circuit, according to one embodiment of the present disclosure.

For the sake of convenience, FIG. 11 illustrates the scan stage circuits SST11 and SST12 of the first scan driver 210.

As illustrated in FIG. 11, the first scan stage circuit SST11 may include a first drive circuit 1210, a second drive circuit 1220, and an output unit 1230.

The output unit 1230 may control a voltage that is supplied to an output terminal 1006 in response to voltages of a first node N1 and a second node N2. The output unit 1230 may include a fifth transistor M5 and a sixth transistor M6.

The fifth transistor M5 may be connected between a fourth input terminal 1004 to which the first drive power supply VDD1 is input and the output terminal 1006, and a gate electrode of the fifth transistor M5 may be connected to the first node N1. The fifth transistor M5 may control a connection between the fourth input terminal 1004 and the output terminal 1006 in response to a voltage that is applied to the first node N1.

The sixth transistor M6 may be connected between the output terminal 1006 and a third input terminal 1003, and a gate electrode of the sixth transistor M6 may be connected to the second node N2. The sixth transistor M6 may control a connection between the output terminal 1006 and the third input terminal 1003 in response to a voltage that is applied to the second node N2.

The output unit 1230 may be driven as a buffer. Additionally, the fifth transistor M5 and/or the sixth transistor M6 may be configured by a plurality of transistors connected in parallel to each other.

The first drive circuit 1210 may control a voltage of a third node N3 in response to signals that are supplied to a first input terminal 1001 to the third input terminal 1003.

The first drive circuit 1210 may include a second transistor M2 to a fourth transistor M4.

The second transistor M2 may be connected between the first input terminal 1001 and the third node N3, and a gate electrode of the second transistor M2 may be connected to a second input terminal 1002. The second transistor M2 may control a connection between the first input terminal 1001 and the third node N3 in response to a signal that is supplied to the second input terminal 1002.

The third transistor M3 and the fourth transistor M4 may be connected in series between the third node N3 and the fourth input terminal 1004. The third transistor M3 may be connected between the fourth transistor M4 and the third node N3, and a gate electrode of the third transistor M3 may be connected to the third input terminal 1003. The third transistor M3 may control a connection between the fourth transistor M4 and the third node N3 in response to a signal that is supplied to the third input terminal 1003.

The fourth transistor M4 may be connected between the third transistor M3 and the fourth input terminal 1004, and a gate electrode of the fourth transistor M4 may be connected to the first node N1. The fourth transistor M4 may control a connection between the third transistor M3 and the fourth input terminal 1004 in response to a voltage of the first node N1.

The second drive circuit 1220 may control the voltage of the first node N1 in response to the voltages of the second input terminal 1002 and the third node N3. The second drive circuit 1220 may include a first transistor M1, a seventh transistor M7, an eighth transistor M8, a first capacitor C1, and a second capacitor C2.

The first capacitor C1 may be connected between the second node N2 and the output terminal 1006. The first capacitor C1 may be charged with a voltage corresponding to turn-on and turn-off.

The second capacitor C2 may be connected between the first node N1 and the fourth input terminal 1004. The second capacitor C2 may be charged with a voltage that is applied to the first node N1.

The seventh transistor M7 may be connected between the first node N1 and the second input terminal 1002, and a gate electrode of the seventh transistor M7 may be connected to the third node N3. The third transistor M7 may control a connection between the first node N1 and the second input terminal 1002 in response to the voltage of the third node N3.

The eighth transistor M8 may be connected between the first node N1 and a fifth input terminal 1005 to which the second drive power supply VSS1 is supplied, and a gate electrode of the eighth transistor M8 may be connected to the second input terminal 1002. The eighth transistor M8 may control a connection between the first node N1 and the fifth input terminal 1005 in response to a signal of the second input terminal 1002.

The first transistor M1 may be connected between the third node N3 and the second node N2, and a gate electrode of the first transistor M1 may be connected to the fifth input terminal 1005. The first transistor M1 may provide a connection between the third node N3 and the second node N2 while maintaining a turn-on state. Additionally, the first transistor M1 may control a decrease width of the voltage of the third node N3 in response to a voltage of the second node N2. In other words, although the voltage of the second node N2 may decrease to a voltage lower than the second drive power supply VSS1, the voltage of the third node N3 may not decrease to a voltage lower than a voltage that is obtained by subtracting a threshold voltage of the first transistor M1 from the second drive power supply VSS1. Description on this will be described below.

The second scan stage circuit SST12 and the other scan stage circuits SST13 to SST1k may have the same configuration as the first scan stage circuit SST11.

The second input terminal 1002 of the jth (j is an odd number or an even number) scan stage circuit SST1j may receive the first clock signal CLK1, and the third input terminal 1003 may receive the second clock signal CLK2. The second input terminal 1002 of (j+1)th scan stage circuit SST1j+1 may receive the second clock signal CLK2 and the third input terminal 1003 may receive the first clock signal CLK1.

The first clock signal CLK1 and the second clock signal CLK2 may have the same cycle but have phases that may not overlap each other. As an example, when a period in which a scan signal is supplied to one first scan line S1 is referred to as one horizontal period 1H, each of the clock signals CLK1 and CLK2 may have a cycle of 2H, and may be supplied in horizontal periods different from each other.

FIG. 11 illustrates stage circuits included in the first scan driver 210, but stage circuits included in the second scan driver 220 other than the first scan driver 210 may also have the same circuit configuration.

In addition, the aforementioned dummy scan stage circuits DSST may have the same circuit configuration except that the input terminals 1001-1005, and the output terminal 1006 are not connected to the dummy scan stage circuits DSST.

Figure 12:
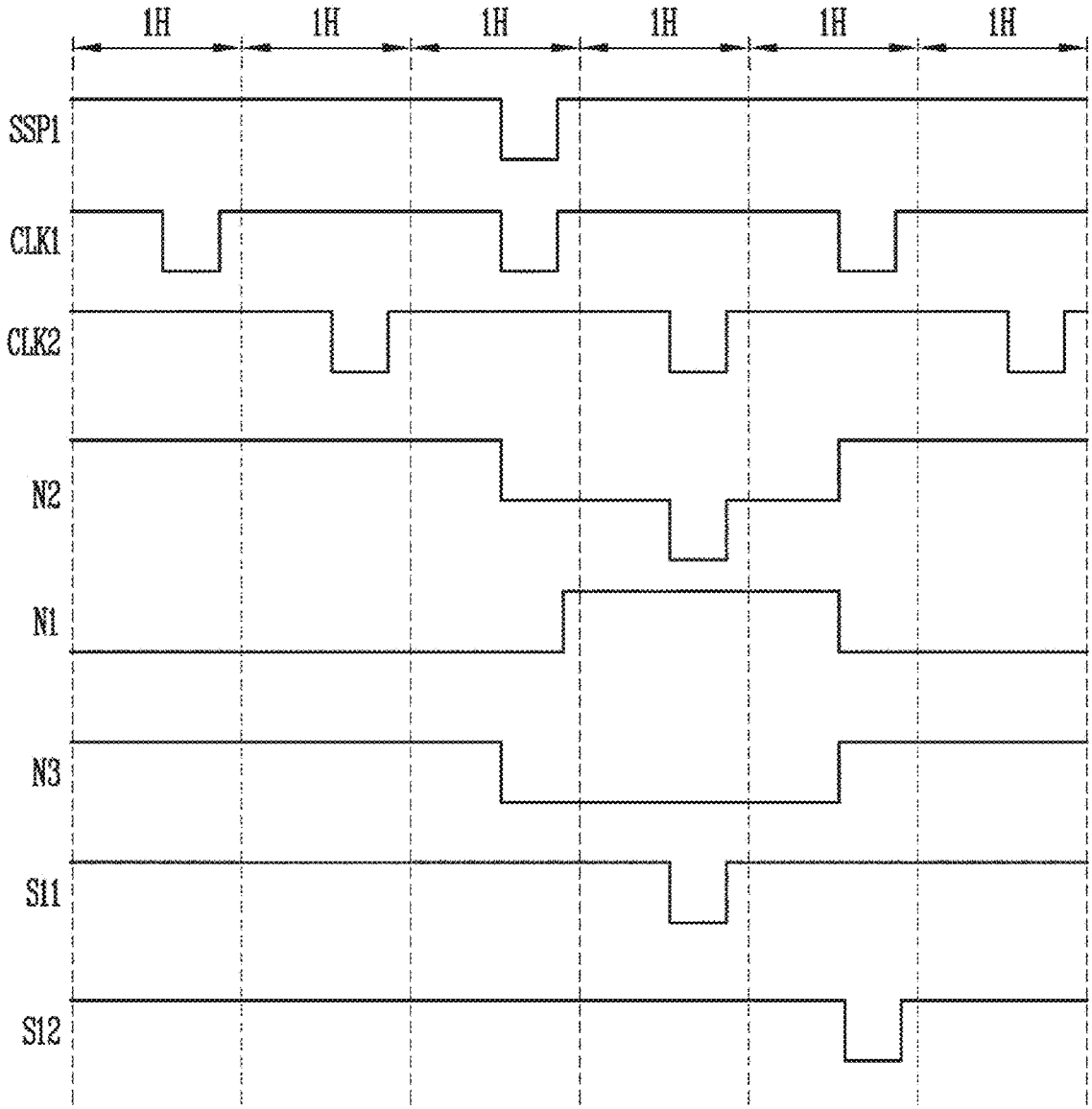
FIG. 12 is a waveform diagram illustrating a driving method of the scan stage circuit illustrated in FIG. 11.

FIG. 12 is a waveform diagram illustrating a driving method of the scan stage circuit illustrated in FIG. 11. FIG. 12 illustrates an operation in which the first scan stage circuit SST11 is used for the sake of convenience.

As illustrated in FIG. 12, each of the first clock signal CLK1 and the second clock signal CLK2 may have a cycle of two horizontal periods 2H, and may be supplied in horizontal periods different from each other. In other words, the second clock signal CLK2 may be set as a signal shifted by a half period (that is, one horizontal period 1H) from the first clock signal CLK1. In addition, the first start pulse SSP1 that is supplied to the first input terminal 1001 is synchronous to a clock signal that is supplied to the second input terminal 1002, that is, the first clock signal CLK1.

When the first start pulse SSP1 is supplied, the first input terminal 1001 may be set to have a voltage of the second drive power supply VSS1, and when the start pulse SSP1 is not supplied, the first input terminal 1001 may be set to have a voltage of the first drive power supply VDD1. In addition, when the clock signals CLK1 and CLK2 are supplied to the second input terminal 1002 and the third input terminal 1003, the second input terminal 1002 and the third input terminal 1003 may be set to have a voltage of the second drive power supply VSS1, and when the clock signals CLK1 and CLK2 are not supplied, the second input terminal 1002 and the third input terminal 1003 may be set to have the voltage of the first drive power supply VDD1.

An operation will be described in detail hereinafter. First, the start pulse SSP1 is supplied to be synchronous to the first clock signal CLK1.

When the first clock signal CLK1 is supplied, the second transistor M2 and the eighth transistor M8 may be turned on. When the second transistor M2 is turned on, the first input terminal 1001 may be connected to the third node N3. Here, the first transistor M1 may be set to be continuously turned on, and thereby, an electrical connection between the second node N2 and the third node N3 may be maintained.

When the first input terminal 1001 is electrically connected to the third node N3, the third node N3 and the second node N2 may be set to have a voltage of a low level by the start pulse SSP1 that is supplied to the first input terminal 1001. When the third node N3 and the second node N2 is set to have a voltage of a low level, the sixth transistor M6 and the third transistor M7 may be turned on.

When the sixth transistor M6 is turned on, the third input terminal 1003 may be electrically connected to the output terminal 1006. Here, the third input terminal 1003 is set to have a voltage of a high level (that is, the second clock signal CLK2 is not supplied), and thereby, a voltage of a high level may also be output to the output terminal 1006. When the third transistor M7 is turned on, the second input terminal 1002 may be electrically connected to the first node N1. Then, a voltage of the first clock signal CLK1, that is, a voltage of a low level that is supplied to the second input terminal 1002 may be supplied to the first node N1.

When the first clock signal CLK1 is supplied, the eighth transistor M8 may be turned on. When the eighth transistor M8 is turned on, a voltage of the second drive power supply VSS1 may be supplied to the first node N1. Here, the voltage of the second drive power supply VSS1 may be set as a voltage that is the same as the first clock signal CLK1, and thus, the first node N1 may stably maintain a voltage of a low level.

When the first node N1 is set to have a voltage of a low level, the fourth transistor M4 and the fifth transistor M5 may be turned on. When the fourth transistor M4 is turned on, the fourth input terminal 1004 may be electrically connected to the third transistor M3. Here, the third transistor M3 is set to be in a turn-off state, and thus, the third node N3 may stably maintain the voltage of a low level although the fourth transistor M4 is turned on.

When the fifth transistor M5 is turned on, the voltage of the first drive power supply VDD1 may be supplied to the output terminal 1006. Here, the voltage of the first drive power supply VDD1 may be set to a voltage of a high level that is supplied to the third input terminal 1003, and thereby, the output terminal 1006 may stably maintain the voltage of a high level.

Thereafter, supplying of the start pulse SSP1 and the first clock signal CLK1 may be stopped. When supplying of the first clock signal CLK1 is stopped, the second transistor M2 and the eighth transistor M8 may be turned off. Meanwhile, the sixth transistor M6 and the third transistor M7 may be maintained to be in a turn-on state in response to the voltage stored in the first capacitor C1. That is, the second node N2 and the third node N3 may be maintained at a voltage of a low level by the voltage stored in the first capacitor C1.

When the sixth transistor M6 is maintained in a turn-on state, an electrical connection between the output terminal 1006 and the third input terminal 1003 may be maintained. When the seventh transistor M7 is maintained in a turn-on state, an electrical connection between the first node N1 and the second input terminal 1002 may be maintained. Here, a voltage of the second input terminal 1002 may be set to a voltage of a high level as supplying of the first clock signal CLK1 is stopped, and thereby, the first node N1 may also be set to a voltage of a high level. When a voltage of a high level is supplied to the first node N1, the fourth transistor M4 and the fifth transistor M5 may be turned off.

Thereafter, the second clock signal CLK2 may be supplied to the third input terminal 1003. Since the sixth transistor M6 is set to be in a turn-on state, the second clock signal CLK2 supplied to the third input terminal 1003 may be supplied to the output terminal 1006. In this case, the output terminal 1006 may output the second clock signal CLK2 to the first scan line as the scan signal.

Meanwhile, when the second clock signal CLK2 is supplied to the output terminal 1006, the voltage of the second node N2 may decrease to a voltage lower than the second drive power supply VSS1 due to a coupling of the first capacitor C1, and thereby, the sixth transistor M6 may be stably maintained in a turn-on state.

Meanwhile, although the voltage of the second node N2 decreases, the third node N3 may be maintained at approximately the voltage of the second drive power supply VSS1 (for example, a voltage that is obtained by subtracting a threshold voltage of the first transistor M1 from the second drive power supply VSS1) by the first transistor M1.

After the scan signal is output to the first line S11 of the first scan lines, supplying of the second clock signal CLK2 may be stopped. When supplying of the second clock signal CLK2 is stopped, the output terminal 1006 may output a voltage of a high level. In addition, the voltage of the second node N2 may increase to approximately the voltage of the second drive power supply VSS1 in response to a voltage of a high level of the output terminal 1006.

Thereafter, the first clock signal CLK1 may be supplied. When the first clock signal CLK1 is supplied, the second transistor M2 and the eighth transistor M8 may be turned on. When the second transistor M2 is turned on, the first input terminal 1001 may be electrically connected to the third node N3. The start pulse SSP1 may not be supplied to the first input terminal 1001, and the first input terminal 1001 may be set to have a voltage of a high level. Hence, when the first transistor M1 is turned on, a voltage of a high level may be supplied to the third node N3 and the second node N2, and thereby, the sixth transistor M6 and the third transistor M7 may be turned off.

When the eighth transistor M8 is turned off, the second drive power supply VSS1 may be supplied to the first node N1, and thereby, the fourth transistor M4 and the fifth transistor M5 may be turned on. When the fifth transistor M5 is turned on, the voltage of the first drive power supply VDD1 may be supplied to the output terminal 1006. Thereafter, the fourth transistor M4 and the fifth transistor M5 may be maintained in a turn-on state in response to a voltage stored in the second capacitor C2, and thereby, the output terminal 1006 may stably receive the voltage of the first drive power supply VDD1.

Additionally, when the second clock signal CLK2 is supplied, the third transistor M3 may be turned on. Since the fourth transistor M4 is set to be in a turn-on state, the voltage of the first drive power supply VDD1 may be supplied to the third node N3 and the second node N2. In this case, the sixth transistor M6 and the third transistor M7 may be stably maintained in a turn-off state.

The second scan stage circuit SST12 may receive an output signal (that is, a scan signal) of the first scan stage circuit SST11 so as to be synchronous to the second clock signal CLK2. In this case, the second scan stage circuit SST12 may output the scan signal to the second line S12 of the first scan lines so as to be synchronous to the first clock signal CLK1. The scan stage circuits SST according to the present disclosure may repeat the aforementioned processes, and thereby, the scan signals may be sequentially output to the scan lines.

Meanwhile, the first transistor M1 limits a decrease width of a voltage of the third node N3 regardless of the voltage of the second node N2, and thus, it is possible to reduce the manufacturing cost and increase the reliability of driving signals.

Figure 13:
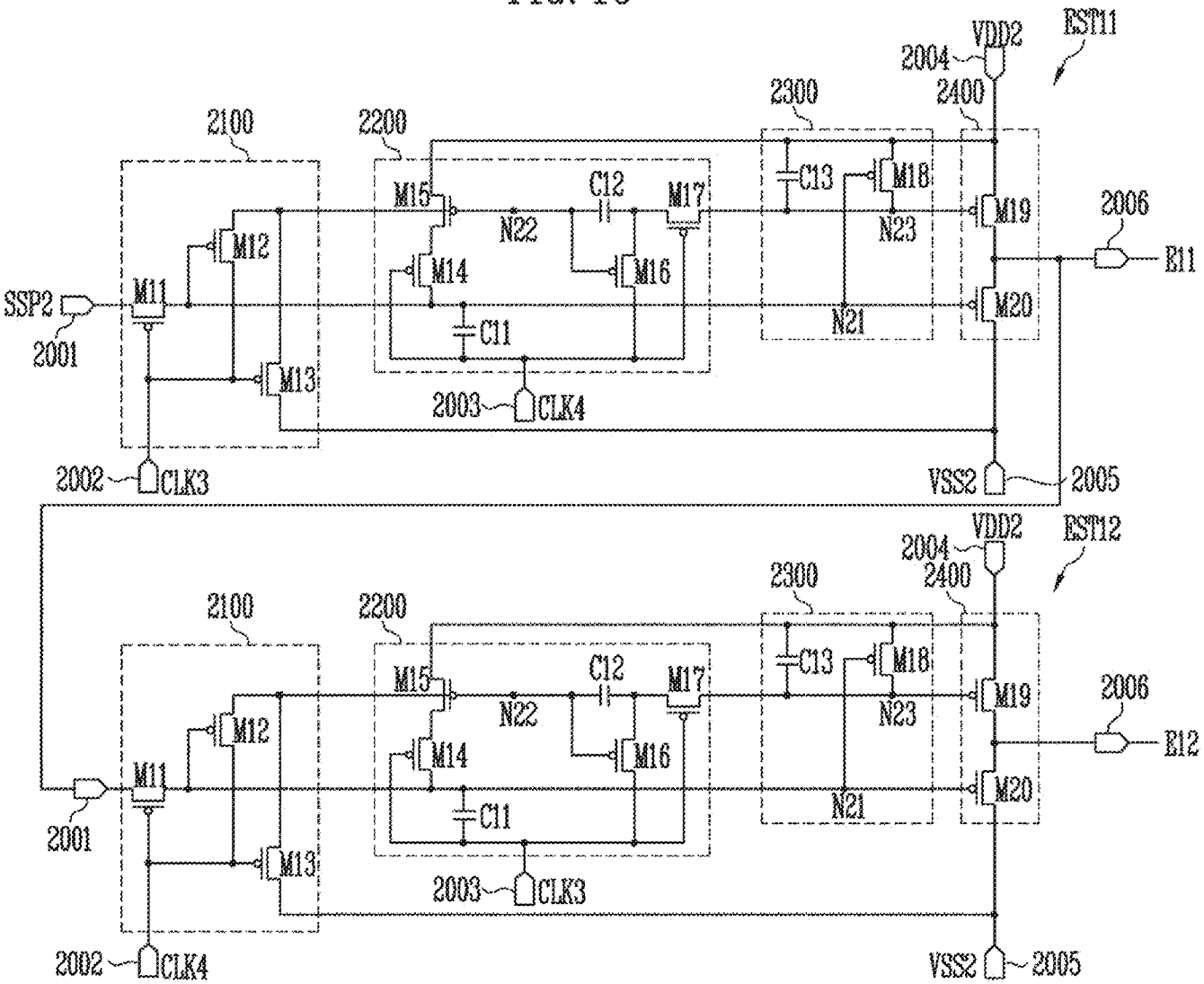
FIG. 13 is a diagram illustrating the emission stage circuit, according to one embodiment of the present disclosure.

FIG. 13 is a diagram illustrating the emission stage circuit, according to one embodiment of the present disclosure.

FIG. 13 illustrates the emission stage circuits EST11 and EST12 of the first emission driver 310 for the sake of convenience.

As illustrated in FIG. 13, the first emission stage circuit EST11 may include a first drive circuit 2100, a second drive circuit 2200, a third drive circuit 2300, and an output unit 2400.

The first drive circuit 2100 may control voltages of a 22nd node N22 and a 21st node N21 in response to signals that are supplied to a first input terminal 2001 and a second input terminal 2002. The first drive circuit 2100 may include an 11th transistor M11 to a 13th transistor M13.

The 11th transistor M11 may be connected between the first input terminal 2001 and the 21st node N21, and a gate electrode of the 11th transistor M11 may be connected to the second input terminal 2002. The 11th transistor M11 may be turned on when the third clock signal CLK3 is supplied to the second input terminal 2002.

The 12th transistor M12 may be connected between the second input terminal 2002 and the 22nd node N22, and a gate electrode of the 12th transistor M12 may be connected to the 21st node N21. The 12th transistor M12 may be turned off in response to a voltage of the 21st node N21.

The 13th transistor M13 may be connected between a fifth input terminal 2005 receiving the fourth drive power supply VSS2 and the 22 ns node N22, and a gate electrode of the 13th transistor M13 may be connected to the second input terminal 2002. The 13th transistor M13 may be turned on when the third clock signal CLK3 is supplied to the second input terminal 2002.

The second drive circuit 2200 may control voltages of the 21st node N21 and a 23rd node N23 in response to a signal that is supplied to a third input terminal 2003 and a voltage of the 22nd node N22. The second drive circuit 2200 may include a 14th transistor M14 to a 17th transistor M17, an 11th capacitor C11, and a 12th capacitor C12.

The 14th transistor M14 may be connected between the 15th transistor M15 and the 21st node N21, and a gate electrode of the 14th transistor M14 may be connected to the third input terminal 2003. The 14th transistor M14 may be turned on when the fourth clock signal CLK4 is supplied to the third input terminal 2003.

The 15th transistor M15 may be connected between a fourth input terminal 2004 receiving the third drive power supply VDD2 and the 14th transistor M14, and a gate electrode of the 15th transistor M15 may be connected to the 22nd node N22. The 15th transistor M15 may be turned on or turned off in response to a voltage of the 22nd node N22.

The 16th transistor M16 may be connected between a first electrode of the 17th transistor M17 and the third input terminal 2003, and a gate electrode of the 16th transistor M16 may be connected to the 22nd node N22. The 16th transistor M16 may be turned on or turned off in response to the voltage of the 22nd node N22.

The 17th transistor M17 may be connected between a first electrode of the 16th transistor M16 and the 23rd node N23, and a gate electrode of the 17th transistor M17 may be connected to the third input terminal 2003. The 17th transistor M17 may be turned on when the fourth clock signal CLK4 is supplied to 2003.

The 11th capacitor C11 may be connected between the 21st node N21 and the third input terminal 2003.

The 12th capacitor C12 may be connected between the 22nd node N22 and the 17th transistor M17.

The third drive circuit 2300 may control a voltage of the $23^{rd}$ node N23 in response to a voltage of the 21st node N21. The third drive circuit 2300 may include an 18th transistor M18 and a 13th capacitor C13.

The 18th transistor M18 may be connected between the fourth input terminal 2004 receiving the third drive power supply VDD2 and the 23rd node N23, and a gate electrode of the 18th transistor M18 may be connected to the 21st node N21. The 18th transistor M18 may be turned on or turned off in response to the voltage of the 21st node N21.

The 13th capacitor C13 may be connected between the fourth input terminal 2004 receiving the third drive power supply VDD2 and the 23rd node N23.

The output unit 2400 may control a voltage that is supplied to an output terminal 2006 in response to the voltages of the 21st node N21 and the 23rd node N23. The output unit 2400 may include a 19th transistor M19 and a 20th transistor M20.

The 19th transistor M19 may be connected between the fourth input terminal 2004 receiving the third drive power supply VDD2 and the output terminal 2006, and a gate electrode of the 19th transistor M19 may be connected to the 23rd node N23. The 19th transistor M19 may be turned on or turned off in response to the voltage of the 23rd node N23.

The 20th transistor M20 may be connected between the output terminal 2006 and the fifth input terminal 2005 receiving the fourth drive power supply VSS2, and a gate electrode of the 20th transistor M20 may be connected to the 21st node N21. The 20th transistor M20 may be turned on or turned off in response to the voltage of the 21st node N21. The output unit 2400 may be driven as a buffer.

Additionally, the 19th transistor M19 and the 20th transistor M20 may be configured by a plurality of transistors that are connected in parallel to each other.

The second emission stage circuit EST12 and the other emission stage circuits EST13 to EST1k may have the same configuration as the first emission stage circuit EST11.

The second input terminal 2002 of the jth emission stage circuit EST1j may receive the third clock signal CLK3 and the third input terminal 2003 may receive the fourth clock signal CLK4. The second input terminal 2002 of the (j+1)th emission stage circuit EST1j+1 may receive the fourth clock signal CLK4, and the third input terminal 2003 may receive the third clock signal CLK3.

The third clock signal CLK3 and the fourth clock signal CLK4 may have the same cycle, but have phases that may not overlap each other. As an example, each of the clock signals CLK3 and CLK4 may have a cycle of 2H, and may be supplied in horizontal periods different from each other.

FIG. 13 illustrates stage circuits included in the first emission driver 310, but stage circuits included in the second emission driver 320 other than the first emission driver 310 may also have the same circuit configuration.

In addition, the aforementioned dummy emission stage circuits DEST may have the same circuit configuration except that the input terminals 2001-2005, and the output terminal 2006 are not connected to the dummy emission stage circuits DEST.

Figure 14:
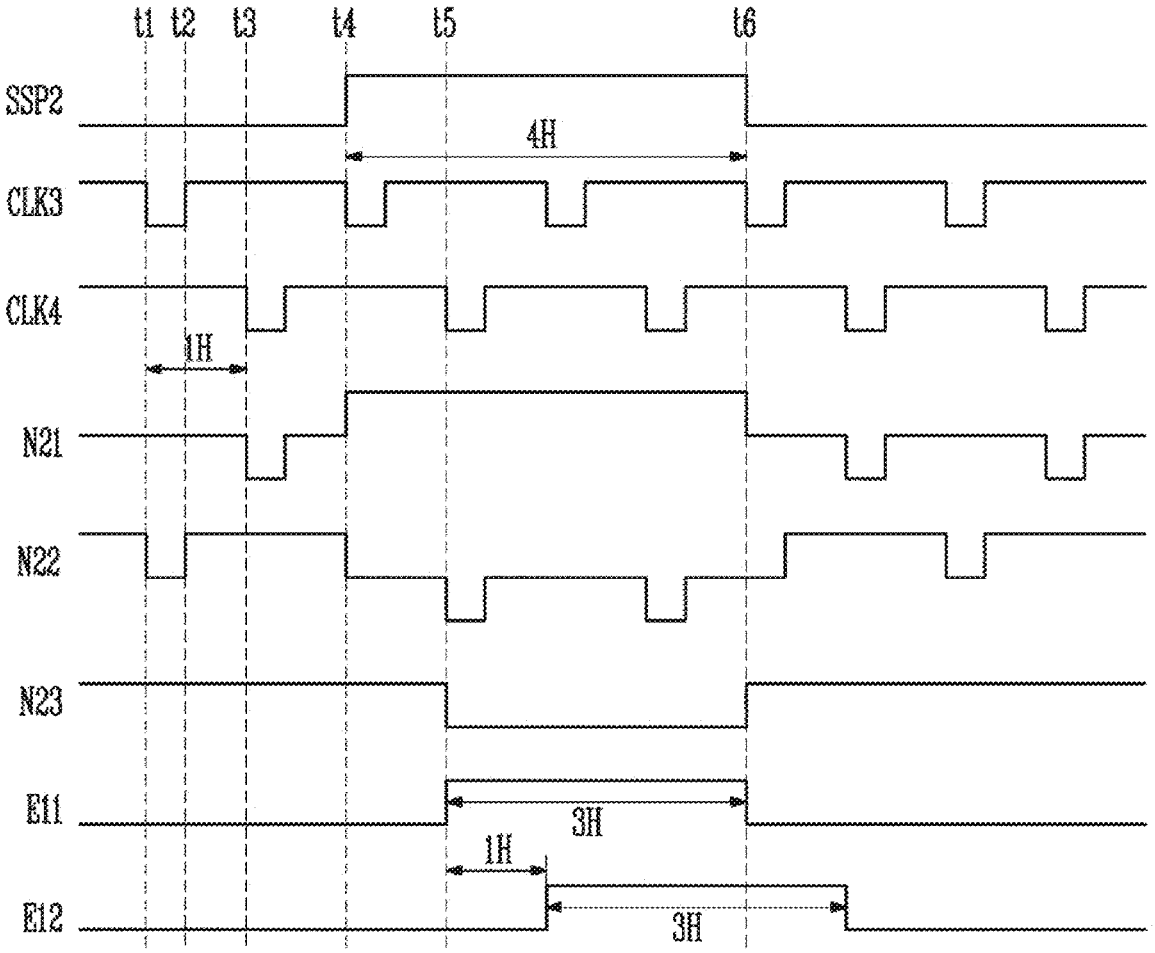
FIG. 14 is a waveform diagram illustrating a driving method of the emission stage circuit illustrated in FIG. 13.

FIG. 14 is a waveform diagram illustrating a driving method of the emission stage circuit illustrated in FIG. 13. FIG. 14 illustrates an operation in which the first emission stage circuit EST11 is used for the sake of convenience.

As illustrated in FIG. 14, each of the third clock signal CLK3 and the fourth clock signal CLK4 may have a cycle of two horizontal periods 2H, and may be supplied in horizontal periods different from each other. In other words, the fourth clock signal CLK4 may be set as a signal shifted by a half period (that is, one horizontal period 1H) from the third clock signal CLK3.

When the start pulse SSP2 is supplied, the first input terminal 2001 may be set to have a voltage of the third drive power supply VDD2, and when the start pulse SSP2 is not supplied, the first input terminal 2001 may be set to have a voltage of the fourth drive power supply VSS2. In addition, when the clock signals CLK3 and CLK4 are supplied to the second input terminal 2002 and the third input terminal 2003, the second input terminal 2002 and the third input terminal 2003 may be set to have the voltage of the fourth drive power supply VSS2, and when the clock signals CLK3 and CLK4 are not supplied, the second input terminal 2002 and the third input terminal 2003 may be set to have the voltage of the third drive power supply VDD2.

The second start pulse SSP2 that is supplied to the first input terminal 2001 may be synchronous to a clock signal that is supplied to the second input terminal 2002, that is, the third clock signal CLK3. In addition, the second start pulse SSP2 may be set to have a width greater than a width of the third clock signal CLK3. As an example, the second start pulse SSP2 may be supplied during horizontal periods 4H.

An operation will be described in detail hereinafter. First, the third clock signal CLK3 may be supplied to the second input terminal 2002 at a first time t1. When the third clock signal CLK3 is supplied to the second input terminal 2002, the 11th transistor M11 and the 13th transistor M13 may be turned on.

When the 11th transistor M11 is turned on, the first input terminal 2001 may be electrically connected to the 21st node N21. Since the second start pulse SSP2 may not be supplied to the first input terminal 2001, a voltage of a low level may be supplied to the 21st node N21.

When the voltage of a low level is supplied to the 21st node N21, the 12th transistor M12, the 18th transistor M18, and the 20th transistor M20 may be turned on.

When the 18th transistor M18 is turned on, the third drive power supply VDD2 may be supplied to the 23rd node N23, and thereby, the 19th transistor M19 may be turned off.

Meanwhile, the 13th capacitor C13 may be charged with a voltage corresponding to the third drive power supply VDD2, and thereby, the 19th transistor M19 may be maintained in a turn-off state after the first time t1.

When the 20th transistor M20 is turned on, the voltage of the fourth drive power supply VSS2 may be supplied to the output terminal 2006. Hence, the emission control signal may not be supplied to the first line E11 of the first emission control lines at the first time t1.

When the 12th transistor M12 is turned on, the third clock signal CLK3 may be supplied to the 22nd node N22. In addition, when the 13th transistor M13 is turned on, the voltage of the fourth drive power supply VSS2 may be supplied to the 22nd node N22. Here, the third clock signal CLK3 may be set as the voltage of the fourth drive power supply VSS2, and thereby, the 22nd node N22 may be stably set to have the voltage of the fourth drive power supply VSS2. Meanwhile, when the voltage of the 22nd node N22 is set to the fourth drive power supply VSS2, the 17th transistor M17 may be set to be in a turn-off state. Hence, the 23rd node N23 may be maintained at the voltage of the third drive power supply VDD2 regardless of the voltage of the 22nd node N22.

Supplying of the third clock signal CLK3 to the second input terminal 2002 may be stopped at a second time t2. When supplying of the third clock signal CLK3 is stopped, the 11th transistor M11 and the 13th transistor M13 may be turned off. At this time, the voltage of the 21st node N21 may be maintained as a voltage of a low level by the 11th capacitor C11, and thereby, the 12th transistor M12 and the 18th transistor M18, and the 20th transistor M20 may be maintained in a turn-on state.

When the 12th transistor M12 is turned on, the second input terminal 2002 may be electrically connected to the 22nd node N22. At this time, the $22^{nd}$ node N22 may be set to have a voltage of a high level.

When the 18th transistor M18 is turned on, the voltage of the third drive power supply VDD2 may be supplied to the 23rd node N23, and thereby, the 19th transistor M19 may be maintained in a turn-off state.

When the 20th transistor M20 is turned on, the voltage of the fourth drive power supply VSS2 may be supplied to the output terminal 2006.

The fourth clock signal CLK4 may be supplied to the third input terminal 2003 at a third time t3. When the fourth clock signal CLK4 is supplied to the third input terminal 2003, the 14th transistor M14 and the 17th transistor M17 may be turned on.

When the 17th transistor M17 is turned on, the 12th capacitor C12 may be electrically connected to the 23rd node N23. At this time, the 23rd node N23 may be maintained at the voltage of the third drive power supply VDD2. In addition, when the 14th transistor M14 is turned on, the 15th transistor M15 may be set to be in a turn-off state, and thereby, the voltage of the 21st node N21 may not change although the 14th transistor M14 is turned on.

When the fourth clock signal CLK4 is supplied to the third input terminal 2003, the voltage of the 21st node N21 may decrease to a voltage lower than the fourth drive power supply VSS2 due to a coupling of the 11th capacitor C11. When the voltage of the 21st node N21 decreases to a voltage lower than the fourth drive power supply VSS2, drive characteristics of the 18th transistor M18 and the 20th transistor M20 may be increased. The lower the voltage that the PMOS transistor receives may be, the better drive characteristics the PMOS transistor would have.

The second start pulse SSP2 may be supplied to the first input terminal 2001 at a fourth time t4, and the third clock signal CLK3 may be supplied to the second input terminal 2002.

When the third clock signal CLK3 is supplied to the second input terminal 2002, the 11th transistor M11 and the 13th transistor M13 may be turned on. When the 11th transistor M11 is turned on, the first input terminal 2001 may be electrically connected to the 21st node N21. Since the second start pulse SSP2 is supplied to the first input terminal 2001, a voltage of a high level may be supplied to the 21st node N21. When the voltage of a high level is supplied to the 21st node N21, the 12th transistor M12, the 18th transistor M18, and the 20th transistor M20 may be turned off.

When the 13th transistor M13 is turned on, the voltage of the fourth drive power supply VSS2 may be supplied to the 22nd node N22. Since the 14th transistor M14 is set to be in a turn-off state, the 21st node N21 may be maintained at voltage of a high level. In addition, since the 17th transistor M17 is set to be in a turn-off state, the voltage of the 23rd node N23 may be maintained as a voltage of a high level by the 13th capacitor C13. Hence, the 19th transistor M19 may be maintained in a turn-off state.

The fourth clock signal CLK4 may be supplied to the third input terminal 2003 at a time t5. When the fourth clock signal CLK4 is supplied to the third input terminal 2003, the 14th transistor M14 and the 17th transistor M17 may be turned on. In addition, since the 22nd node N22 is set to have the voltage of the fourth drive power supply VSS2, the 15th transistor M15 and the 16th transistor M16 may be turned on.

When the 16th transistor M16 and the 17th transistor M17 are turned on, the fourth clock signal CLK4 may be supplied to the 23rd node N23. When the fourth clock signal CLK4 is supplied to the 23rd node N23, the 19th transistor M19 may be turned on. When the 19th transistor M19 is turned on, the voltage of the third drive power supply VDD2 may be supplied to the output terminal 2006. The voltage of the third drive power supply VDD2 supplied to the output terminal 2006 may be supplied to the first line E11 of the first emission control lines as the emission control signal.

Meanwhile, when the voltage of the fourth clock signal CLK4 is supplied to the 23rd node N23, the voltage of the 22nd node N22 may decrease to a voltage lower than the voltage of the fourth drive power supply VSS2 due to a coupling of the 12th capacitor C12, and thus, drive characteristics of transistors connected to the 22nd node N22 may increase.

When the 14th transistor M14 and the 15th transistor M15 are turned on, the voltage of the third drive power supply VDD2 may be supplied to the 21st node N21. Since the voltage of the third drive power supply VDD2 may be supplied to the 21st node N21, the 20th transistor M20 may be maintained in a turn-off state. Hence, the voltage of the third drive power supply VDD2 may be supplied to the first line E11 of the first emission control lines.

The third clock signal CLK3 may be supplied to the second input terminal 2002 at a time t6. When the third clock signal CLK3 is supplied to the second input terminal 2002, the 11th transistor M11 and the 13th transistor M13 may be turned on.

When the 11th transistor M11 is turned on, the 21st node N21 may be electrically connected to the first input terminal 2001, and thereby, the 21st node N21 may be set to have a voltage of a low level. When the 21st node N21 is set to have a voltage of a low level, the 18th transistor M18 and the 20th transistor M20 may be turned on.

When the 18th transistor M18 is turned on, the voltage of the third drive power supply VDD2 may be supplied to the 23rd node N23, and thereby, the 19th transistor M19 may be turned off. If the 20th transistor M20 is turned on, the voltage of the fourth drive power supply VSS2 may be supplied to the output terminal 2006. The voltage of the fourth drive power supply VSS2 supplied to the output terminal 2006 may be supplied to the first line E11 of the first emission control lines, and thereby, supplying of the emission control signal may be stopped.

The emission stage circuits EST according to the present disclosure may repeat the aforementioned processes and thereby, the emission control signals may be sequentially output to the emission control lines.

Figure 15:
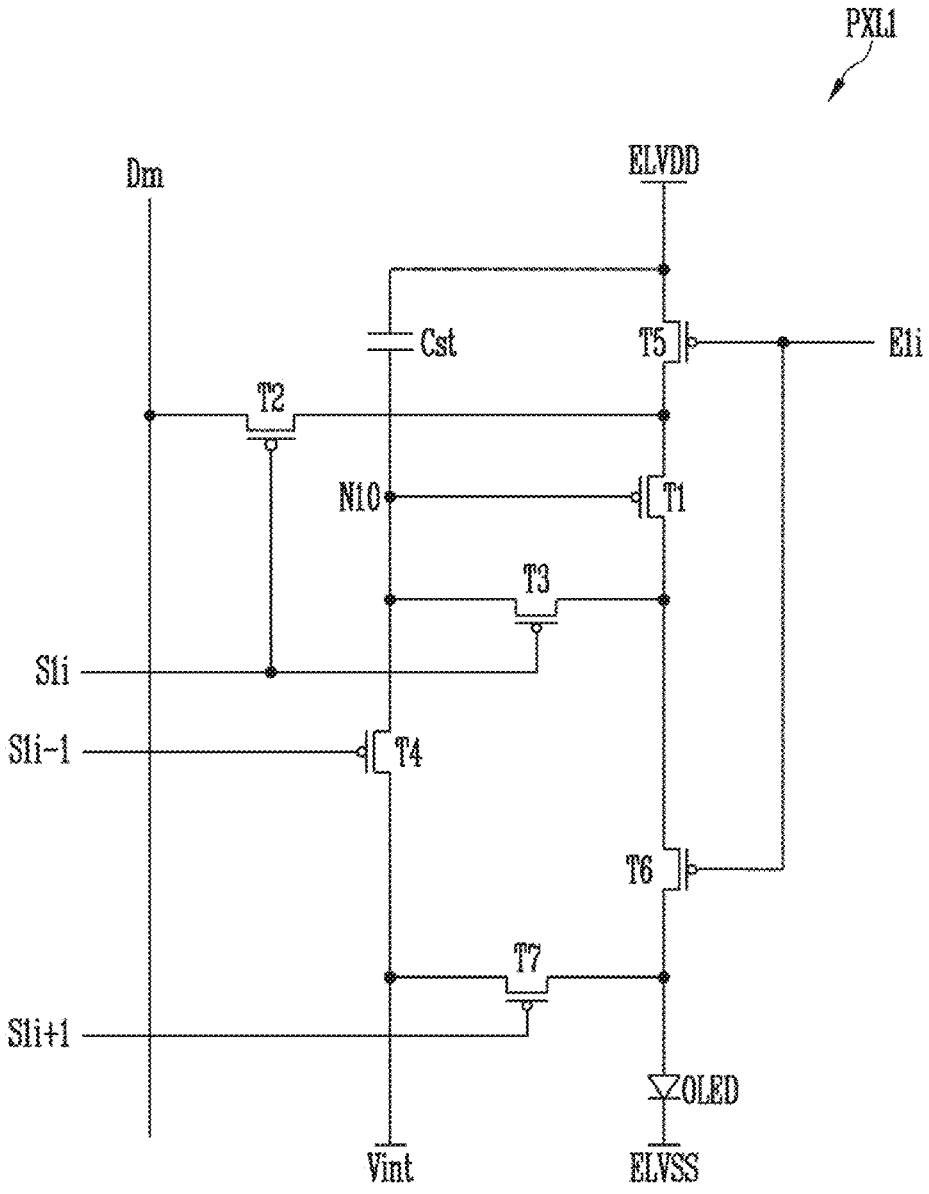
FIG. 15 is a diagram illustrating a pixel, according to one embodiment of the present disclosure.

FIG. 15 is a diagram illustrating the pixel, according to one embodiment of the present disclosure.

FIG. 15 illustrates the first pixel PXL1 connected to an mth data line Dm and an ith line Sli of the first scan lines, for the sake of convenience.

As illustrated in FIG. 15, the first pixel PXL1 may include an organic light emission diode OLED, a first transistor T1 to a seventh transistor T7, and a storage capacitor Cst.

An anode of the organic light emission diode OLED may be connected to the first transistor T1 through the sixth transistor T6, and a cathode of the organic light emission diode OLED may be connected to a second pixel power supply ELVSS. The organic light emission diode OLED may emit light with predetermined luminance in response to a current that is supplied from the first transistor T1.

A first pixel power supply ELVDD may be set to a voltage higher than the second pixel power supply ELVSS such that a current flows through the organic light emission diode OLED.

The seventh transistor T7 may be connected between the initialization power supply Vint and the anode of the organic light emission diode OLED. In addition, a gate electrode of the seventh transistor T7 may be connected to an (i+1)th line Sli+1 of the first scan lines. When a scan signal is supplied to the (i+1)th line Sli+1 of the first scan lines, the seventh transistor T7 may be turned on, and thereby, the voltage of the initialization power supply Vint may be supplied to the anode of the organic light emission diode OLED. Here, the initialization power supply Vint may be set to a voltage lower than a voltage of a data signal.

The sixth transistor T6 may be connected between the first transistor T1 and the organic light emission diode OLED. In addition, a gate electrode of the sixth transistor T6 may be connected to the ith line Eli of the first emission control lines. When an emission control signal is supplied to the ith line Eli of the first emission control lines, the sixth transistor T6 may be turned off, and may be turned on in other cases.

The fifth transistor T5 may be connected between the first pixel power supply ELVDD and the first transistor T1. In addition, a gate electrode of the fifth transistor T5 may be connected to the ith line Eli of the first emission control lines. When the emission control signal is supplied to the ith line Eli of the first emission control lines, the fifth transistor T5 may be turned off, and may be turned on in other cases.

A first electrode of the first transistor T1 (i.e., driving transistor) may be connected to the first pixel power supply ELVDD through the fifth transistor T5, and may be connected to the anode of the organic light emission diode OLED through the sixth transistor T6. In addition, a gate electrode of the first transistor T1 may be connected to a 10th node N10. The first transistor T1 may control a current flowing from the first pixel power supply ELVDD to the second pixel power supply ELVSS through the organic light emission diode OLED in response to a voltage of the 10th node N10.

The third transistor T3 may be connected between a second electrode of the first transistor T1 and the 10th node N10. In addition, a gate electrode of the third transistor T3 may be connected to the ith line Sli of the first scan lines. When the scan signal is supplied to the ith line Sli of the first scan lines, the third transistor T3 may be turned on, and thereby, the second electrode of the first transistor T1 may be electrically connected to the 10th node N10. Hence, when the third transistor T3 is turned on, the first transistor T1 may be connected in a diode form.

The fourth transistor T4 may be connected between the 10th node N10 and the initialization power supply Vint. In addition, a gate electrode of the fourth transistor T4 may be connected to the (i−1)th line Sli−1 of the first scan lines. When the scan signal is supplied to the (i−1)th line Sli−1 of the first scan lines, the fourth transistor T4 may be turned on, thereby, supplying the initialization power supply Vint to the 10th node N10.

The second transistor T2 may be connected between the mth data line Dm and the first electrode of the first transistor T1. In addition, a gate electrode of the second transistor T2 may be connected to the ith line Sli of the first scan lines. When the scan signal is supplied to the ith line Sli of the first scan lines, the second transistor T2 may be turned on, thereby, electrically connecting the first electrode of the first transistor T1 to the mth data line Dm.

The storage capacitor Cst may be connected between the first pixel power supply ELVDD and the 10th node N10. The storage capacitor Cst may store a voltage corresponding to the data signal and a threshold voltage of the first transistor T1.

According to one embodiment, the second pixels PXL2 may be realized by the same circuit as the first pixel PXL1. Hence, detailed description on the second pixels PXL2 will be omitted.

In addition, the pixel structure illustrated in FIG. 15 is just an example that uses a scan line and an emission control line, and the pixels PXL1 and PXL2 according to the present disclosure are not limited to the pixel structure. The pixel may have a circuit structure that can supply a current to the organic light emission diode OLED, and may be selected as any one of various structures that are known.

In the present disclosure, the organic light emission diode OLED may generate various colors of light including red, green, and blue in response to a current that is supplied from a driving transistor, but the present disclosure is not limited to this. For example, the organic light emission diode OLED may generate white color in response to the current that is supplied from the driving transistor. In this case, a color image may be generated by using a separate color filter or the like.

Additionally, the transistors are described by using P-channel (P-type) transistors in the present disclosure for the sake of convenience, but the present disclosure is not limited. In other words, the transistors may be formed by N-channel (N-type) transistors.

In addition, the gate-off voltage and the gate-on voltage of the transistor may be set to voltages of different levels, according to a type of the transistor.

For example, in a case of P-channel transistor, the gate-off voltage and the gate-on voltage may be respectively set as a voltage of a high level and a voltage of a low level, and in a case of N-channel transistor, the gate-off voltage and the gate-on voltage may be respectively set as a voltage of a low level and a voltage of a high level.

Figure 16:
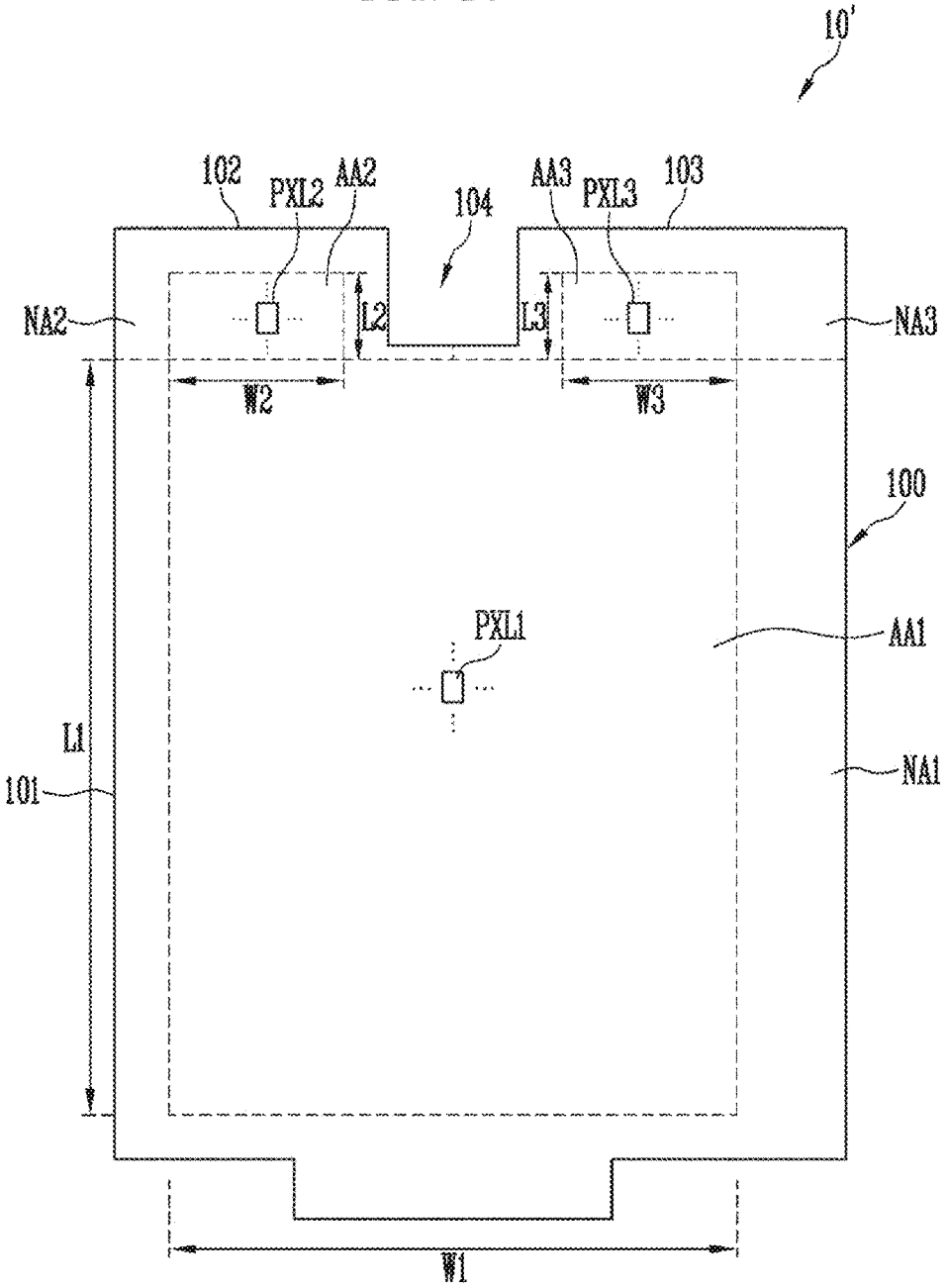
FIG. 16 is a diagram illustrating pixel areas of a display device, according to another embodiment of the present disclosure.

FIG. 16 is a diagram illustrating pixel areas of a display device, according to another embodiment of the present disclosure.

Portions different from the aforementioned embodiment (for example, FIG. 1) will be mainly described with reference to FIG. 16, and portions overlapping the aforementioned embodiment will not be described. According to this, a third pixel area AA3 and third pixels PXL3 will be mainly described hereinafter.

As illustrated in FIG. 16, the display device 10' may include the pixel areas AA1, AA2, and AA3, peripheral areas NA1, NA2, and NA3, and the pixels PXL1, PXL2, and PXL3.

The second pixel area AA2 and the third pixel area AA3 may be positioned on one side of the first pixel area AA1. The second pixel area AA2 and the third pixel area AA3 may be positioned to be separated from each other.

The first pixel area AA1 may have the wider area than the second pixel area AA2 and the third pixel area AA3.

For example, a width W1 of the first pixel area AA1 may be set to be larger than widths W2 and W3 of the other pixel areas AA2 and AA3, and a length L1 of the first pixel area AA1 may be set to be larger than lengths L2 and L3 of the other pixel areas AA2 and AA3.

In addition, each of the second pixel area AA2 and the third pixel area AA3 may have an area smaller than the first pixel area AA1, and may have an area that is the same as or different from each other.

For example, the width W2 of the second pixel area AA2 may be set to be the same as or different from the width W3 of the third pixel area AA3, and the length L2 of the second pixel area AA2 may be set to be the same as or different from the length L3 of the third pixel area AA3.

The third peripheral area NA3 may be positioned outside the third pixel area AA3, and may have a shape surrounding at least a part of the third pixel area AA3.

A width of the third peripheral area NA3 may be set to be substantially uniform along the surrounding periphery of the third pixel area AA3. However, the present disclosure is not limited to this, and the width of the third peripheral area NA3 may be set differently according to a position.

The second peripheral area NA2 and the third peripheral area NA3 may be connected to each other or may not be connected to each other, according to a shape of the substrate 100.

Widths of the peripheral areas NA1, NA2, and NA3 may be set to be the same overall. However, the present disclosure is not limited to this, and the widths of the peripheral areas NA1, NA2, and NA3 may be set differently according to a position.

The pixels PXL1, PXL2, and PXL3 may include the first pixel PXL1, the second pixels PXL2, and the third pixels PXL3.

For example, the first pixel PXL1 may be positioned in the first pixel area AA1, the second pixels PXL2 may be positioned in the second pixel area AA2, and the third pixels PXL3 may be positioned in the third pixel area AA3.

The pixels PXL1, PXL2, and PXL3 may emit light with predetermined luminance according to a control of the drivers positioned in the peripheral areas NA1, NA2, and NA3, and each of the pixels may include a light emission element (for example, an organic light emission diode).

The substrate 100 may be formed in various forms in which the aforementioned pixel areas AA1, AA2, and AA3 and the aforementioned peripheral area NA1, NA2, and NA3 can be set.

For example, the substrate 100 may include the base substrate 101, and a first auxiliary plate 102 and a second auxiliary plate 103 that protrude and extend on one side from one end portion of the base substrate 101.

According to one embodiment, the first auxiliary plate 102 and the second auxiliary plate 103 may be formed as one piece with the base substrate 101, and a concave portion 104 may be positioned between the first auxiliary plate 102 and the second auxiliary plate 103.

The concave portion 104 may be formed by removing a part of the substrate 100, and thereby, the first auxiliary plate 102 and the second auxiliary plate 103 may be separated from each other.

The first auxiliary plate 102 and the second auxiliary plate 103 may have areas smaller than the area of the base substrate 101, and may have the same area as or different areas from each other.

The first auxiliary plate 102 and the second auxiliary plate 103 may be formed in various shapes in which the pixel area AA2 and AA3 and the peripheral area NA2 and NA3 can be set.

In this case, the aforementioned first pixel area AA1 and first peripheral area NA1 may be defined in the base substrate 101, the aforementioned second pixel area AA2 and second peripheral area NA2 may be defined in the first auxiliary plate 102, and the aforementioned third pixel area AA3 and third peripheral area NA3 may be defined in the second auxiliary plate 103.

The base substrate 101 may also have various shapes. For example, the base substrate 101 may have a polygonal shape, a ring shape, or the like. In addition, at least a part of the base substrate 101 may have a curve shape.

For example, the base substrate 101 may have a quadrangle as illustrated in FIG. 16. A corner portion of the base substrate 101 may be deformed to a slope form or a curve shape.

The base substrate 101 may have a shape that is the same as or similar to the first pixel area AA1, but is not limited to this, and may have a different shape from the first pixel area AA1.

The first auxiliary plate 102 and the second auxiliary plate 103 may also have various shapes.

For example, the first auxiliary plate 102 and the second auxiliary plate 103 may have a shape such as a polygonal shape or a ring shape. In addition, at least a part of the first auxiliary plate 102 and the second auxiliary plate 103 may have a curve shape.

The concave portion 104 may have various shapes. For example, the concave portion 104 may have a shape such as a polygonal shape or a ring shape. In addition, at least a part of the concave portion 104 may have a curve shape.

The third pixel area AA3 may have various shapes. For example, the third pixel area AA3 may have a shape such as a polygonal shape or a ring shape.

In addition, at least a part of the third pixel area AA3 may have a curve shape.

For example, a corner portion of the third pixel area AA3 may have a curve shape with a predetermined curvature.

In this case, at least a part of the third peripheral area NA3 may have a curve shape corresponding to the third pixel area AA3.

The number of third pixels PXL3 positioned in one line (row or column) may change according to a position in accordance with a deformation of the third pixel area AA3.

Figure 17:
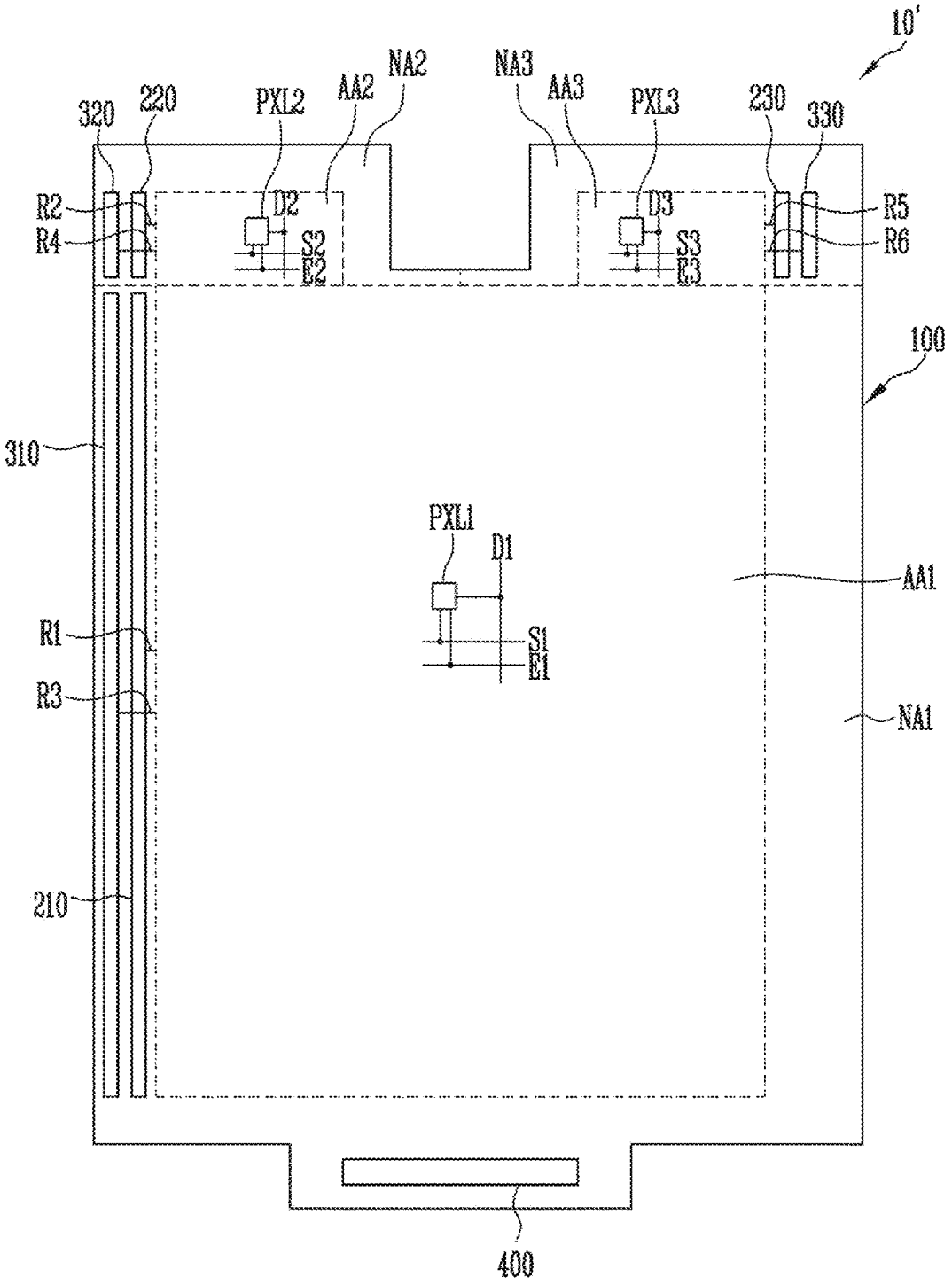
FIG. 17 is a diagram illustrating the display device, according to another embodiment of the present disclosure.

FIG. 17 is a diagram illustrating the display device, according to another embodiment of the present disclosure.

Portions different from the aforementioned embodiment (for example, FIG. 2) will be mainly described with reference to FIG. 16, and portions overlapping the aforementioned embodiment will not be described. According to this, the third pixels PXL3, a third scan driver 230, and a third emission driver 330 will be mainly described hereinafter.

As illustrated in FIG. 17, the display device 10' may include the substrate 100, the first pixel PXL1, the second pixels PXL2, the third pixels PXL3, the first scan driver 210, the second scan driver 220, the third scan driver 230, the first emission driver 310, the second emission driver 320, and the third emission driver 330.

The third pixels PXL3 may be positioned in the third pixel area AA3, and may be respectively connected to third scan lines S3, third emission control lines E3, and third data lines D3.

The third scan driver 230 may supply third scan signals to the third pixels PXL3 through the third scan lines S3.

For example, the third scan driver 230 may sequentially supply the third scan signals to the third scan lines S3.

The third scan driver 230 may be positioned in the third peripheral area NA3.

For example, the third scan driver 230 may be positioned in the third peripheral area NA3 that is positioned on one side (for example, the right side as shown in FIG. 17) of the third pixel area AA3.

Third scan routing wires R5 may be connected between the third scan driver 230 and the third scan lines S3.

The third scan driver 230 may be electrically connected to the third scan lines S3 that are positioned in the third pixel area AA3 through the third scan routing wires R5.

The third emission driver 330 may supply third emission control signals to the third pixels PXL3 through the third emission control lines E3.

For example, the third emission driver 330 may sequentially supply the third emission control signals to the third emission control lines E3.

The third emission driver 330 may be positioned in the third peripheral area NA3.

For example, the third emission driver 330 may be positioned in the third peripheral area NA3 that is positioned on one side (for example, the right side as shown in FIG. 17) of the third pixel area AA3.

FIG. 17 illustrates the third emission driver 330 that is positioned outside the third scan driver 230, but, in another embodiment, the third emission driver 330 may be positioned inside the third scan driver 230.

Third emission routing wires R6 may be connected between the third emission driver 330 and the third emission lines E3.

The third emission driver 330 may be electrically connected to the third emission control lines E3 that are positioned in the third pixel area AA3 through the third emission routing wires R6.

If the third pixels PXL3 has a structure in which the third emission control signals are not required, the third emission driver 330, the third emission routing wires R6, and the third emission control lines E3 may be omitted.

Since the third pixel area AA3 has an area smaller than the first pixel area AA1, lengths of the third scan lines S3 and the third emission control lines E3 may be smaller than lengths of the first scan lines S1 and the first emission control lines E1.

In addition, the number of third pixels PXL3 connected to one third scan line S3 may be smaller than the number of first pixel PXL1 connected to one first scan line S1, and the number of third pixels PXL3 connected to one third emission control line E3 may be smaller than the number of first pixel PXL1 connected to one first emission control line E1.

The data driver 400 may supply data signals to pixels PXL1, PXL2, and PXL3 through the data lines D1, D2, and D3. For example, the second data lines D2 may be connected to a part of the first data lines D1, and the third data lines D3 may be connected to another part of the first data lines D1.

Figure 18:
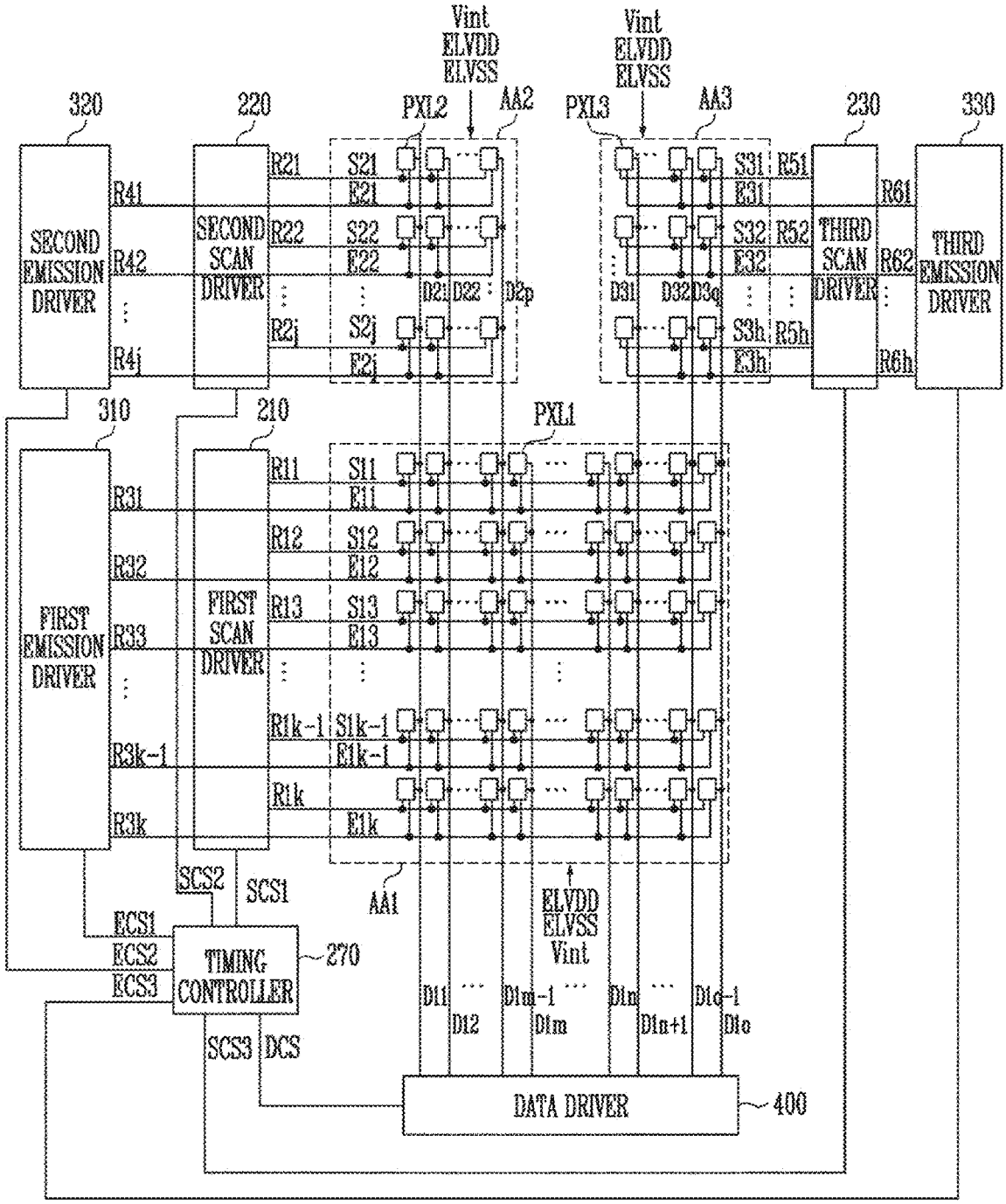
FIG. 18 is a more detailed diagram of the display device, according to another embodiment of the present disclosure.

FIG. 18 is a more detailed diagram of the display device, according to another embodiment of the present disclosure.

Portions different from the aforementioned embodiment (for example, FIG. 3) will be mainly described with reference to FIG. 18, and portions overlapping the aforementioned embodiment will not be described. According to this, the third scan driver 230 and the third emission driver 330 will be mainly described hereinafter.

The third scan driver 230 may supply the third scan signals to the third pixels PXL3 through the third scan routing wires R51 to R5h and the third scan lines S31 to S3h.

The third scan routing wires R51 to R5h may be connected between an output terminal of the third scan driver 230 and the third scan lines S31 to S3h.

For example, the third scan routing wires R51 to R5h and the third scan lines S31 to S3h may be positioned in layers different from each other, and in this case, may be connected to each other through contact holes (not illustrated).

The third scan driver 230 may operate in response to a third scan control signal SCS3.

The third emission driver 330 may supply the third emission control signals to the third pixels PXL3 through third emission routing wires R61 to R6h and third emission control lines E31 to E3h.

The third emission routing wires R61 to R6h may be connected between an output terminal of the third emission driver 330 and the third emission control lines E31 to E3h.

For example, the third emission routing wires R61 to R6h and the third emission control lines E31 to E3h may be positioned in layers different from each other, and in this case, may be connected to each other through contact holes (not illustrated).

The third emission driver 330 may operate in response to a third emission control signal ECS3.

The data driver 400 may supply the data signals to the third pixels PXL3 through third data lines D31 to D3q.

The third pixels PXL3 may be connected to the first pixel power supply ELVDD and the second pixel power supply ELVSS. If necessary, the third pixels PXL3 may be additionally connected to the initialization power supply Vint.

When the third scan signals are supplied to the third scan lines S31 to S3h, the third pixels PXL3 may receive the data signals from the third data lines D31 to D3q, and the third pixels PXL3 received the data signals may control a current flowing from the first pixel power supply ELVDD to the second pixel power supply ELVSS through an organic light emission diode (not illustrated).

The number of third pixels PXL3 that are positioned in one line (row or column) may change according to a position.

For example, the third data lines D31 to D3q may be connected to a part of the first data lines D1n+1 to D1o.

In addition, the second data lines D21 to D2p may be connected to a part of the first data lines D11 to Dlm−1.

Since the third pixel area AA3 has an area smaller than the first pixel area AA1, the number of third pixels PXL3 may be smaller than the number of first pixel PXL1, and lengths of the third scan lines S31 to S3h and the third emission control lines E31 to E3h may be smaller than the lengths of the first scan lines S11 to S1k and the first emission control lines E11 to E1k.

The number of third pixels PXL3 connected to any one of the third scan lines S31 to S3h may be smaller than the number of first pixel PXL1 connected to any one of the first scan lines S11 to S1k.

In addition, the number of third pixels PXL3 connected to any one of the third emission control lines E31 to E3h may be smaller than the number of first pixel PXL1 connected to any one of the first emission control lines E11 to E1k.

The timing controller 270 may supply the third scan control signal SCS3 and the third emission control signal ECS3 to the third scan driver 230 and the third emission driver 330, respectively, so as to control the third scan driver 230 and the third emission driver 330.

Each of the third scan control signal SCS3 and the third emission control signal ECS3 may include at least one clock signal and at least one start pulse.

Figure 19:
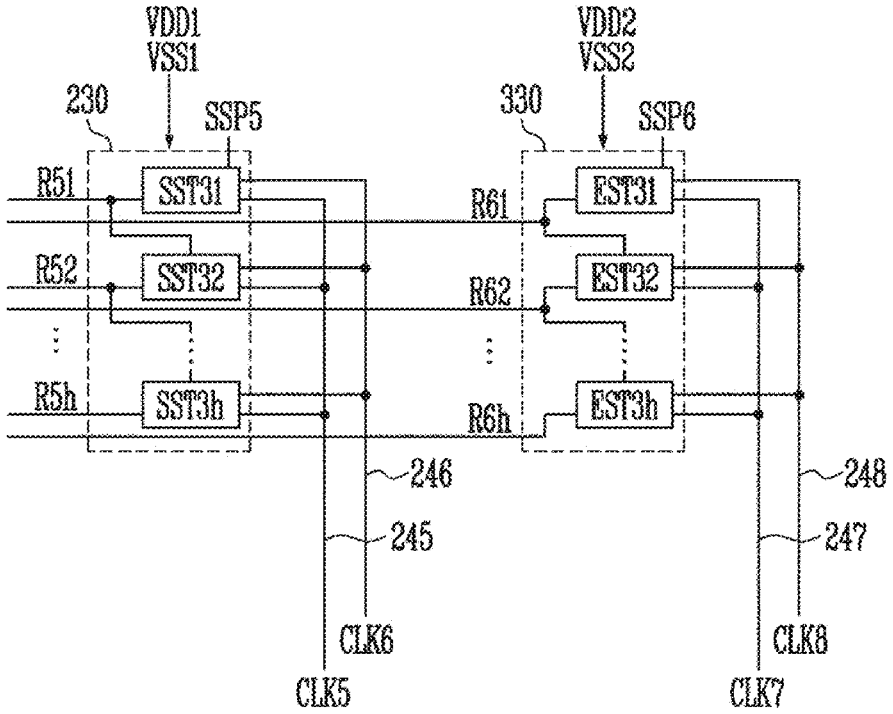
FIG. 19 is a more detailed diagram of a third scan driver and a third emission driver illustrated in FIG. 18.

FIG. 19 is a more detailed diagram of the third scan driver and the third emission driver illustrated in FIG. 18.

As illustrated in FIG. 19, the third scan driver 230 may include multiple the third scan stage circuits SST31 to SST3h.

Each of the third scan stage circuits SST31 to SST3h may be connected to a corresponding terminal of the third scan routing wires R51 to R5h, thereby, supplying the third scan signals to the third scan lines S31 to S3h.

The third scan stage circuits SST31 to SST3h may operate in response to the clock signals CLK5 and CLK6 that are supplied from the timing controller 270. According to one embodiment, the third scan stage circuits SST31 to SST3h may be realized by the same circuit.

The third scan stage circuits SST31 to SST3h may receive an output signal of a prior scan stage circuit or a start pulse SSP5.

For example, the first circuit SST31 of the third scan stage circuits may receive the start pulse SSP5, and the other third scan stage circuits SST32 to SST3h may receive an output signal of the prior scan stage circuit.

Each of the third scan stage circuits SST31 to SST3h may receive the first drive power supply VDD1 and the second drive power supply VSS1.

A fifth clock line 245 and a sixth clock line 246 may be connected to the third scan driver 230.

The fifth clock line 245 and the sixth clock line 246 may be connected to the timing controller 270, thereby, transmitting the fifth clock signal CLK5 and the sixth clock signal CLK6 that are supplied from the timing controller 270 to the third scan driver 230.

According to one embodiment, the fifth clock line 245 and the sixth clock line 246 may be disposed in the first peripheral area NA1 and the third peripheral area NA3.

The fifth clock signal CLK5 and the sixth clock signal CLK6 may have phases different from each other. For example, the sixth clock signal CLK6 may have a phase difference of 180 degrees with respect to the fifth clock signal CLK5.

FIG. 19 illustrates that the third scan driver 230 uses two clock signals CLK5 and CLK6, and the number of clock signals that are used by the third scan driver 230 may change according to a structure of the scan stage circuits.

The third scan stage circuits SST31 to SST3h may have the same circuit structure as the first scan stage circuits SST11 to SST1k and the second scan stage circuits SST21 to SST2j that are described above.

The third emission driver 330 may include multiple third emission stage circuits EST31 to EST3h.

Each of the third emission stage circuits EST31 to EST3h may be connected to a corresponding terminal of the third emission routing wires R61 to R6h, thereby, supplying the third emission control signals to the third emission control lines E31 to E3h.

The third emission stage circuits EST31 to EST3h may operate in response to clock signals CLK7 and CLK8 that are supplied from the timing controller 270. According to one embodiment, the third emission stage circuits EST31 to EST3h may be realized by the same circuit.

The third emission stage circuits EST31 to EST3h may receive an output signal (that is, an emission control signal) of a prior emission stage circuit or a start pulse SSP6.

For example, the first circuit EST31 of the third emission stage circuits may receive the sixth pulse SSP6, and the other third emission stage circuits EST32 to EST3h may receive an output signal of the prior emission stage circuit.

Each of the third emission stage circuits EST31 to EST3h may receive the third drive power supply VDD2 and the fourth drive power supply VSS2.

A seventh clock line 247 and an eighth clock line 248 may be connected to the third emission driver 330.

In addition, the seventh clock line 247 and the eighth clock line 248 may be connected to the timing controller 270, thereby, transmitting the seventh clock signal CLK7 and the eighth clock signal CLK8 that are supplied from the timing controller 270 to the third emission driver 330.

According to one embodiment, the seventh clock line 247 and the eighth clock line 248 may be disposed in the first peripheral area NA1 and the third peripheral area NA3.

The seventh clock signal CLK7 and the eighth clock signal CLK8 may have phases different from each other. For example, the eighth clock signal CLK8 may have a phase difference of 180 degrees with respect to the seventh clock signal CLK7.

FIG. 19 illustrates that the third emission driver 330 uses two clock signals CLK7 and CLK8, and the number of clock signals that are used by the third emission driver 330 may change according to a structure of the emission stage circuits.

The third emission stage circuits EST31 to EST3h may have the same circuit structure as the first emission stage circuits EST11 to EST1k and the second emission stage circuits EST21 to EST2j that are described above.

Figure 20:
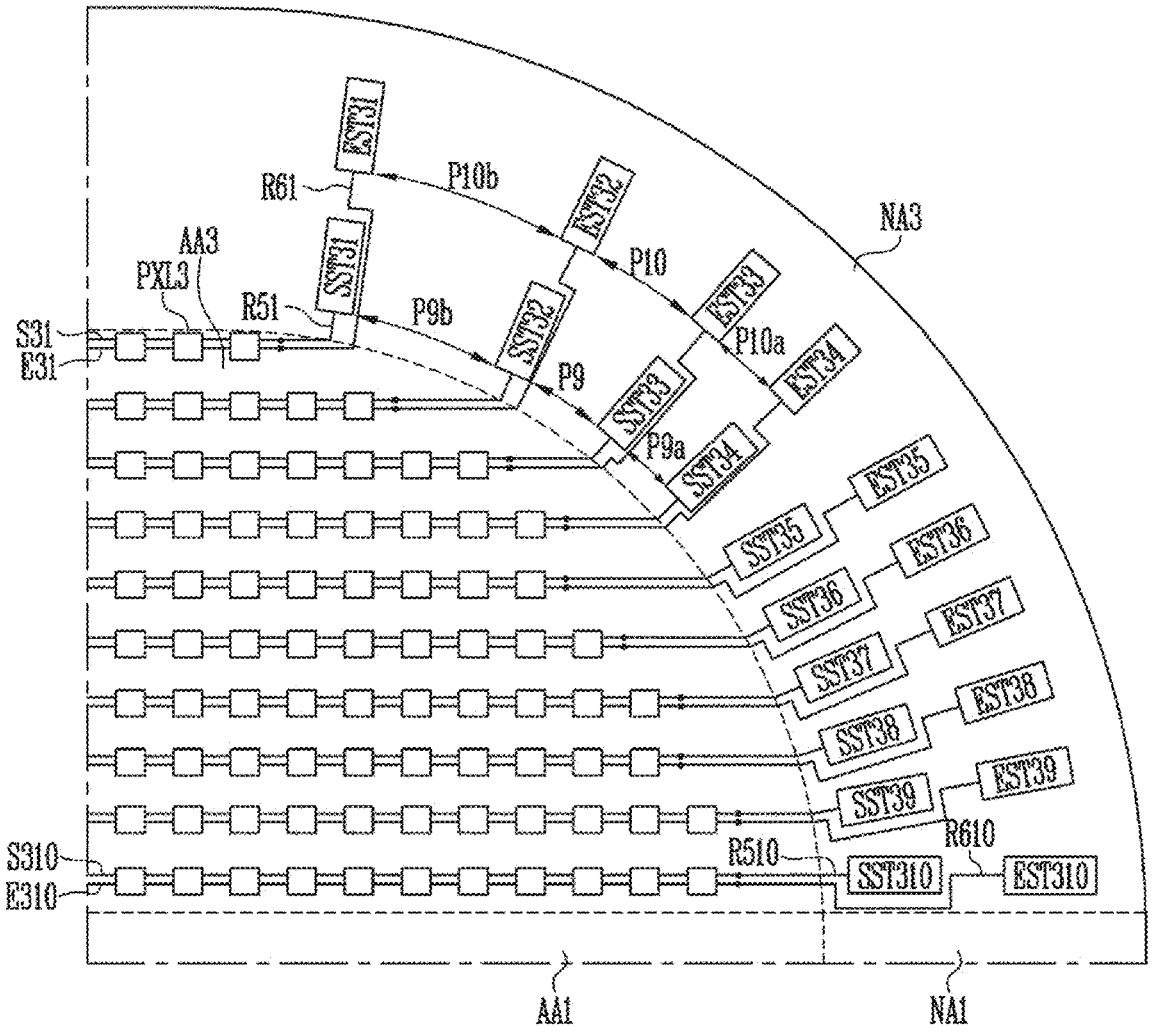
FIG. 20 is a diagram illustrating a layout structure of third scan stage circuits and third emission stage circuits, according to one embodiment of the present disclosure.

FIG. 20 is a diagram illustrating a layout structure of the third scan stage circuits and the third emission stage circuits, according to one embodiment of the present disclosure.

Particularly, FIG. 20 exemplarily illustrates the third scan stage circuits SST31 to SST310 and the third emission stage circuits EST31 to EST310 that are disposed in the third peripheral area NA3.

As illustrated in FIG. 20, a corner portion of the third peripheral area NA3 may have a curve shape. For example, an area, in which the third scan stage circuits SST31 to SST310 and the third emission stage circuits EST31 to EST310 are disposed, of the third peripheral area NA3 may have a bent shape with a predetermined curvature as illustrated in FIG. 20.

A corner portion of the third pixel area AA3 corresponding to the curve shape of the third peripheral area NA3 may also have a curve shape.

In order for the corner portion of the third pixel area AA3 to have a curve shape, the farther the row of the pixels in the third pixel area AA3 are from the first pixel area AA1, the smaller number of the pixels PXL3 the row may include.

The farther the row of the pixels arranged in the third pixel area AA3 are from the first pixel area AA1, the smaller the length of the row is. The length may not be required to be reduced in the same ratio, and the number of third pixels PXL3 included in each row of the pixels may variously change according to curvature of a curve forming the corner portion of AA3.

The third scan stage circuits SST31 to SST310 and the third emission stage circuits EST31 to EST310 may be disposed in the same shape as the second scan stage circuits SST21 to SST210 and the second emission stages EST21 to EST210 that are illustrated in FIG. 5.

For example, a gap P9 between the adjacent third scan stage circuits SST31 to SST310 may be set to be larger than the gap P1 between the adjacent first scan stage circuits SST11 to SST16.

In addition, the gaps P9 between the adjacent third scan stage circuits SST31 to SST310 may be set to be different from each other according to a position.

For example, a gap P9a between a pair of the third scan stage circuits SST33 and SST34 may be set differently from a gap P9b between a pair of the third scan stage circuits SST31 and SST32.

Specifically, the gap P9b between the pair of the third scan stage circuits SST31 and SST32 may be set to be larger than the gap P9a between the pair of the third scan stage circuits SST33 and SST34.

The pair of the third scan stage circuits SST31 and SST32 may be positioned farther from the first peripheral area NA1, compared with the pair of the third scan stage circuits SST33 and SST34.

In other words, the farther the gap P9 between the adjacent third scan stage circuits SST31 to SST310 are from the first peripheral area NA1, the larger the gap P9 may become.

In addition, the third scan stage circuits SST31 to SST310 may have a predetermined slope, compared with the first scan stage circuits SST11 to SST16. For example, the farther the third scan stage circuits SST31 to SST310 are from the first peripheral area NA1, the larger the slope may become.

The third emission stages EST31 to EST310 may be disposed in the substantially similar manner as the third scan stage circuits SST31 to SST310.

For example, a gap P10 between the adjacent third emission stages EST31 to EST310 may be set to be larger than the gap P3 between the adjacent first emission stage circuits EST11 to EST16.

In addition, the gaps P10 between the adjacent third emission stages EST31 to EST310 may be set differently from each other according to a position.

For example, a gap P10a between a pair of the third emission stages EST33 and EST34 may be set differently from a gap P10b between a pair of the third emission stages EST31 and EST32.

Specifically, the gap P10b between the pair of the third emission stages EST31 and EST32 may be set to be larger than the gap P10a between the pair of the third emission stages EST33 and EST34.

The pair of the third emission stages EST31 and EST32 may be positioned farther away from the first peripheral area NA1, compared with the pair of the third emission stages EST33 and EST34.

In other words, the farther the gap P10 between the adjacent third emission stages EST31 to EST310 is from the first peripheral area NA1, the larger the gap P10 may become.

In addition, the third emission stage circuits EST31 to EST310 may have a predetermined slope, compared with the first emission stage circuits EST11 to EST16. For example, the farther the third emission stage circuits EST31 to EST310 are from the first peripheral area NA1, the larger the slope may become.

The third scan stage circuits SST31 to SST310 may be electrically connected to the third scan lines S31 to S310 through the third scan routing wires R51 to R510.

In this case, since the corner portion of the third pixel area AA3 is set to have a curve shape, lengths of the third scan routing wires R51 to R510 may be set to be larger than lengths of the first scan routing wires R11 to R16.

According to one embodiment, a connection point between the third scan routing wires R51 to R510 and the third scan lines S31 to S310 may be positioned within the third pixel area AA3.

The third emission stage circuits EST31 to EST310 may be electrically connected to the third emission control lines E31 to E310 through the third emission routing wires R61 to R610.

In this case, since the corner portion of the third pixel area AA3 is set to have a curve shape, lengths of the third emission routing wires R61 to R610 may be set to be larger than lengths of the first emission routing wires R31 to R36.

According to one embodiment, a connection point between the third emission routing wires R61 to R610 and the first emission control lines E31 to E310 may be positioned within the third pixel area AA3.

In addition, while not illustrated separately, the third scan stage circuits SST31 to SST310 and the third emission stage circuits EST31 to EST310 may be disposed in the substantially similar manner as illustrated in FIGS. 6A and 6B.

Figure 21:
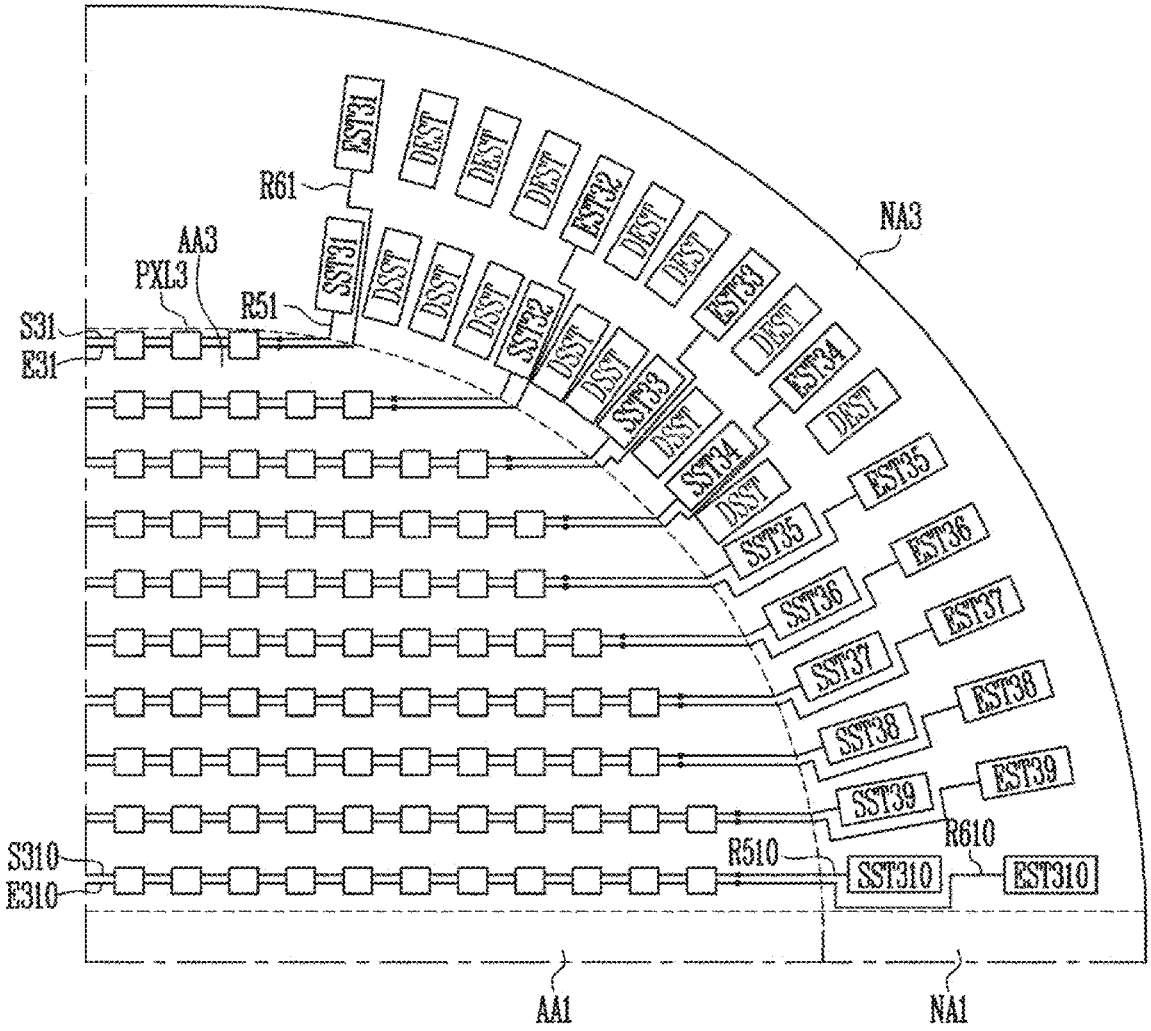
FIG. 21 is a diagram illustrating a layout structure of the dummy stage circuits, according to one embodiment of the present disclosure.

FIG. 21 is a diagram illustrating a layout structure of the dummy stage circuits, according to one embodiment of the present disclosure.

Particularly, FIG. 21 illustrates a shape in which the dummy stage circuits DSST and DEST are disposed in the embodiment illustrated in FIG. 20.

As illustrated in FIG. 21, the third scan driver 230 may further include the dummy scan stage circuits DSST positioned in the third peripheral area NA3.

For example, the dummy scan stage circuits DSST may be positioned between the third scan stage circuits SST31 to SST310, and the number of dummy scan stage circuits DSST may be set differently from each other according to a position.

For example, the number of dummy scan stage circuits DSST positioned between a pair of the third scan stage circuits SST33 and SST34 may be different from the number of dummy scan stage circuits DSST positioned between a pair of the third scan stage circuits SST31 and SST32.

Specifically, the number of dummy scan stage circuits DSST positioned between the pair of the third scan stage circuits SST31 and SST32 may be set to be larger than the number of dummy scan stage circuits DSST positioned between the pair of the third scan stage circuits SST33 and SST34.

The pair of the third scan stage circuits SST31 and SST32 may be positioned farther away from the first peripheral area NA1, compared with the pair of the third scan stage circuits SST33 and SST34.

The dummy scan stage circuits DSST may have the same circuit structure as the third scan stage circuits SST31 to SST310, but may not be connected to the clock lines 245 and 246, and thus, an output operation of the scan signal may not be performed.

In addition, the third emission driver 330 may further include the dummy emission stage circuits DEST positioned in the third peripheral area NA3.

For example, the dummy emission stage circuits DEST may be positioned between the third emission stage circuits EST31 to EST310, and the number of dummy emission stage circuits DEST may be set differently according to a position.

For example, the number of dummy emission stage circuits DEST positioned between a pair of the third emission stage circuits EST33 and EST34 may be different from the number of dummy emission stage circuits DEST positioned between a pair of the third emission stage circuits EST31 and EST32.

Specifically, the number of dummy emission stage circuits DEST positioned between the pair of the third emission stage circuits EST31 and EST32 may be set to be larger than the number of dummy emission stage circuits DEST positioned between the pair of the third emission stage circuits EST33 and EST34.

The pair of the third emission stage circuits EST31 and EST32 may be positioned farther away from the first peripheral area NA1, compared with the pair of the third emission stage circuits EST33 and EST34.

The dummy emission stage circuits DEST may have the same circuit structure as the third emission stage circuits EST31 to EST310, but may not be connected to the clock lines 247 and 248, and thus, an output operation of the emission control signal may not be performed.

Meanwhile, while not illustrated separately, the third scan stage circuits SST31 to SST310, the third emission stage circuits EST31 to EST310, and the dummy emission stage circuits DEST may be disposed in the substantially similar manner as in FIG. 9A and FIG. 9B.

Those skilled in the art of the present disclosure will be able to understand that the present disclosure can be realized in other specific forms without changing the technical spirit or essential features. Hence, it should be understood that the embodiments described above are exemplary only and are not limitative. The scope of the present disclosure is defined by the scope of claims that will be described below rather than the aforementioned description. In addition, it should be interpreted that the entire changes or modifications that are derived from the meaning and the scope of claims and the equivalent concept are included in the scope of the present disclosure.

What is claimed is:

[1. A display device comprising:

first scan stage circuits positioned in a first peripheral area and configured to supply first scan signals to first scan lines, wherein the first scan stage circuits are arranged in a first direction;

second scan stage circuits positioned in a second peripheral area and configured to supply second scan signals to second scan lines, wherein the second scan stage circuits are arranged beyond the first direction; and dummy scan stage circuits positioned between adjacent second scan stage circuits.]

[2. The display device according to claim 1, wherein at least some of the second scan stage circuits have slopes with reference to a second direction, and wherein the first scan stage circuits do not have slopes with reference to the second direction.]

3. [The display device according to claim 1,] *A display device comprising:*

*first scan stage circuits positioned in a first peripheral area and configured to supply first scan signals to first scan lines, wherein the first scan stage circuits are arranged in a first direction;*

*second scan stage circuits positioned in a second peripheral area and configured to supply second scan signals to second scan lines, wherein the second scan stage circuits are arranged beyond the first direction; and*

*dummy scan stage circuits positioned between adjacent second scan stage circuits;* wherein a number of the dummy scan stage circuits is set differently according to a position.

4. The display device according to claim 3, wherein the second scan stage circuits include a first pair of the adjacent second scan stage circuits and a second pair of the adjacent second scan stage circuits, wherein the dummy scan stage circuits comprise:

at least one first dummy scan stage circuit that is disposed between the first pair of the adjacent second scan stage circuits; and second dummy scan stage circuits that are disposed between the second pair of the adjacent second scan stage circuits, and wherein a number of the second dummy scan stage circuits is larger than a number of the first dummy scan stage circuit.

5. The display device according to claim 4, wherein the second pair of the adjacent second scan stage circuits is farther away from the first peripheral area than the first pair of the adjacent second scan stage circuits.

[6. The display device according to claim 1, wherein a first group of adjacent stages comprises N of the second scan stage circuits and M of the dummy scan stage circuits, wherein a second group of adjacent stages comprises P of the second scan stage circuits and Q of the dummy scan stage circuits, wherein N, M, P, and Q are integers greater than 0, wherein N and P are different, and wherein N+M equals to P+Q.]

[7. The display device according to claim 6, wherein N is greater than P, and wherein the second group of adjacent stages is farther away from the first peripheral area than the first group of adjacent stages.]

8. A display device comprising:

first emission stage circuits positioned in a first peripheral area and configured to supply first emission control signals to first emission control lines, wherein the first emission stage circuits are arranged in a first direction;

second emission stage circuits positioned in a second peripheral area and configured to supply second emission control signals to second emission control lines, wherein the second emission stage circuits are arranged beyond the first direction; and dummy emission stage circuits positioned between adjacent second emission stage circuits.

9. The display device according to claim 8, wherein at least some of the second emission stage circuits have slopes with reference to a second direction, and wherein the first emission stage circuits do not have slopes with reference to the second direction.

10. The display device according to claim 8, wherein a number of the dummy emission stage circuits is set differently according to a position.

11. The display device according to claim 10, wherein the second emission stage circuits include a first pair of the adjacent second emission stage circuits and a second pair of the adjacent second emission stage circuits, wherein the dummy emission stage circuits comprise:

at least one first dummy emission stage circuit that is disposed between the first pair of the adjacent second emission stage circuits; and second dummy emission stage circuits that are disposed between the second pair of the adjacent second emission stage circuits, and wherein a number of the second dummy emission stage circuits is larger than a number of the first dummy emission stage circuit.

12. The display device according to claim 11, wherein the second pair of the adjacent second emission stage circuits is farther away from the first peripheral area than the first pair of the adjacent second emission stage circuits.

13. The display device according to claim 8, wherein a first group of adjacent stages comprises N of the second emission stage circuits and M of the dummy emission stage circuits, wherein a second group of adjacent stages comprises P of the second emission stage circuits and Q of the dummy emission stage circuits, wherein N, M, P, and Q are integers greater than 0, wherein N and P are different, and wherein N+M equals to P+Q.

14. The display device according to claim 13, wherein N is greater than P, and wherein the second group of adjacent stages is farther away from the first peripheral area than the first group of adjacent stages.

[15. A display device comprising:

first scan stage circuits positioned in a first peripheral area and configured to supply first scan signals to first scan lines, wherein the first scan stage circuits are arranged in a first direction; and second scan stage circuits positioned in a second peripheral area and configured to supply second scan signals to second scan lines, wherein the second scan stage circuits are arranged beyond the first direction, wherein a gap between adjacent second scan stage circuits is different from a gap between adjacent first scan stage circuits.]

[16. The display device according to claim 15, wherein at least some of the second scan stage circuits have slopes with reference to a second direction, and wherein the first scan stage circuits do not have slopes with reference to the second direction.]

[17. The display device according to claim 15, wherein the gap between adjacent second scan stage circuits is larger than the gap between adjacent first scan stage circuits.]

[18. The display device according to claim 15, wherein the second scan stage circuits include a first pair of the adjacent second scan stage circuits and a second pair of the adjacent second scan stage circuits, and wherein a gap between the second pair of the adjacent second scan stage circuits is larger than a gap between the first pair of the adjacent second scan stage circuits.]

[19. The display device according to claim 15, further comprising:

at least one dummy scan stage circuit positioned between the adjacent second scan stage circuits.]

*20. A display device comprising:*

*first scan stage circuits positioned in a first peripheral area and configured to supply first scan signals to first scan lines, wherein the first scan stage circuits have a first arrangement;*

*second scan stage circuits positioned in a second peripheral area and configured to supply second scan signals to second scan lines, wherein the second scan stage circuits have a second arrangement beyond the first arrangement; and*

*dummy scan stage circuits positioned between adjacent second scan stage circuits;*

*wherein a number of the dummy scan stage circuits is set differently according to a position.*

*21. The display device according to claim 20, wherein the second scan stage circuits include a first pair of the adjacent second scan stage circuits and a second pair of the adjacent second scan stage circuits,*

*wherein the dummy scan stage circuits comprise:*

*at least one first dummy scan stage circuit that is disposed between the first pair of the adjacent second scan stage circuits; and*

*second dummy scan stage circuits that are disposed between the second pair of the adjacent second scan stage circuits, and*

*wherein a number of the second dummy scan stage circuits is larger than a number of the first dummy scan stage circuit.*

*22. The display device according to claim 21, wherein the second pair of the adjacent second scan stage circuits is farther away from the first peripheral area than the first pair of the adjacent second scan stage circuits.*

*23. A display device comprising:*

*first emission stage circuits positioned in a first peripheral area and configured to supply first emission control signals to first emission control lines. wherein the first emission stage circuits have a first arrangement;*

*second emission stage circuits positioned in a second peripheral area and configured to supply second emission control signals to second emission control lines. wherein the second emission stage circuits have a second arrangement beyond the first arrangement; and*

*dummy emission stage circuits positioned between adjacent second emission stage circuits.*

*24. The display device according to claim 23, wherein, in the first arrangement, the first emission stage circuits are arranged in a first direction.*

*25. The display device according to claim 24,*

*wherein, in the second arrangement, at least some of the second emission stage circuits are arranged in a direction oblique to the first direction, and*

*wherein the first emission stage circuits are not arranged in the direction oblique to the first direction.*

*26. The display device according to claim 23, wherein a number of the dummy emission stage circuits is set differently according to a position.*

*27. The display device according to claim 26,*

*wherein the second emission stage circuits include a first pair of the adjacent second emission stage circuits and a second pair of the adjacent second emission stage circuits,*

*wherein the dummy emission stage circuits comprise:*

*at least one first dummy emission stage circuit that is disposed between the first pair of the adjacent second emission stage circuits; and*

*second dummy emission stage circuits that are disposed between the second pair of the adjacent second emission stage circuits, and*

*wherein a number of the second dummy emission stage circuits is larger than a number of the first dummy emission stage circuit.*

*28. The display device according to claim 27, wherein the second pair of the adjacent second emission stage circuits is farther away from the first peripheral area than the first pair of the adjacent second emission stage circuits.*

*29. The display device according to claim 23,*

*wherein a first group of adjacent stages comprises N of the second emission stage circuits and M of the dummy emission stage circuits,*

*wherein a second group of adjacent stages comprises P of the second emission stage circuits and Q of the dummy emission stage circuits,*

*wherein N, M, P, and Q are integers greater than 0,*

*wherein N and P are different, and*

*wherein N+M equals to P+Q.*

*30. The display device according to claim 29,*

*wherein N is greater than P, and*

*wherein the second group of adjacent stages is farther away from the first peripheral area than the first group of adjacent stages.*

*31. A display device comprising:*

*first scan stage circuits positioned in a first peripheral area and configured to supply first scan signals to first scan lines, wherein the first scan stage circuits have a first arrangement;*

*second scan stage circuits positioned in a second peripheral area and configured to supply second scan signals to second scan lines, wherein the second scan stage circuits have a second arrangement beyond the first arrangement; and*

*dummy scan stage circuits positioned between adjacent second scan stage circuits;*

*first emission stage circuits positioned in the first peripheral area and configured to supply first emission control signals to first emission control lines, wherein the first emission stage circuits have a third arrangement;*

*second emission stage circuits positioned in the second peripheral area and configured to supply second emission control signals to second emission control lines, wherein the second emission stage circuits have a fourth arrangement beyond the third arrangement; and*

*dummy emission stage circuits positioned between adjacent second emission stage circuits.*

* * * * *